US011036009B2

(12) United States Patent
Leigh et al.

(10) Patent No.: US 11,036,009 B2
(45) Date of Patent: Jun. 15, 2021

(54) RECONFIGURABLE OPTICAL FERRULE CARRIER MATING SYSTEM

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/948,676

(22) Filed: Sep. 28, 2020

(65) Prior Publication Data

US 2021/0011226 A1 Jan. 14, 2021

Related U.S. Application Data

(62) Division of application No. 16/362,464, filed on Mar. 22, 2019, now Pat. No. 10,788,626.

(51) Int. Cl.
*G02B 6/38* (2006.01)
(52) U.S. Cl.
CPC ......... *G02B 6/3825* (2013.01); *G02B 6/3831* (2013.01); *G02B 6/3869* (2013.01); *G02B 6/3897* (2013.01)
(58) Field of Classification Search
None
See application file for complete search history.

(56) References Cited

U.S. PATENT DOCUMENTS

| 4,174,882 A | 11/1979 | McCartney |
| 5,222,169 A | 6/1993 | Chang et al. |
| 5,600,748 A | 2/1997 | Kosaka |
| 5,633,970 A | 5/1997 | Olson et al. |
| 5,692,080 A | 11/1997 | Lu |
| 6,394,662 B1 | 5/2002 | Foster |
| 7,373,037 B2 | 5/2008 | Wu |
| 8,406,597 B2 | 3/2013 | Case |

(Continued)

OTHER PUBLICATIONS

TTIFiber, "Singlemode MPO Fiber Optic Cassette with LC Duplex Optical Fiber Adapter", available online at <http://www.ttifiber.com/sale-8491346-singlemode-mpo-fiber-optic-cassette-with-lc-duplex-optical-fiber-adapter.html>, retrieved on Oct. 5, 2020, 4 pages.

(Continued)

*Primary Examiner* — Jerry Rahll
(74) *Attorney, Agent, or Firm* — Hewlett Packard Enterprise Patent Department

(57) ABSTRACT

A reconfigurable optical ferrule (ROF) carrier mating system is provided. The ROF carrier mating system comprising a reconfigurable carrier adapter comprising an adapter mid-wall comprising a plurality of ferrule mating sleeves, with a first carrier receptacle on a first side of the adapter mid-wall and a second carrier receptacle on a second side of the adapter mid-wall. Each ROF carrier can take on either a serial orientation or a parallel orientation based on the alignment of a plurality of duplex ferrule connectors disposed within each ROF carrier. The plurality of ferrules of the ROF carriers inserted into the first carrier receptacle are configured to mate with the plurality of ferrules of the ROF carriers inserted into the second ferrule carrier receptacle.

6 Claims, 18 Drawing Sheets

(56) References Cited

U.S. PATENT DOCUMENTS

| | | | |
|---|---|---|---|
| 8,768,116 B2 | 7/2014 | McColloch et al. | |
| 9,897,767 B2 | 2/2018 | Murray et al. | |
| 9,927,582 B2 | 3/2018 | Chang et al. | |
| 10,067,301 B2 | 9/2018 | Murray et al. | |
| 10,107,973 B2 | 10/2018 | Sano et al. | |
| 10,156,683 B2 | 12/2018 | Manes et al. | |
| 10,191,230 B2 | 1/2019 | Wong et al. | |
| 2009/0232455 A1* | 9/2009 | Nhep | G02B 6/3893 385/59 |
| 2011/0222819 A1 | 9/2011 | Anderson et al. | |
| 2019/0018201 A1* | 1/2019 | Takano | G02B 6/387 |
| 2019/0018209 A1 | 1/2019 | Takano et al. | |
| 2019/0079249 A1* | 3/2019 | Tamekuni | G02B 6/3831 |
| 2019/0154923 A1 | 5/2019 | Flaig | |
| 2020/0341201 A1* | 10/2020 | Leigh | G02B 6/3851 |

OTHER PUBLICATIONS

William L. DiBella, "Data Center World Global 2018: Product Information Session PIS3", Senko Group, Mar. 12-15, 2018; 96 pages.

\* cited by examiner

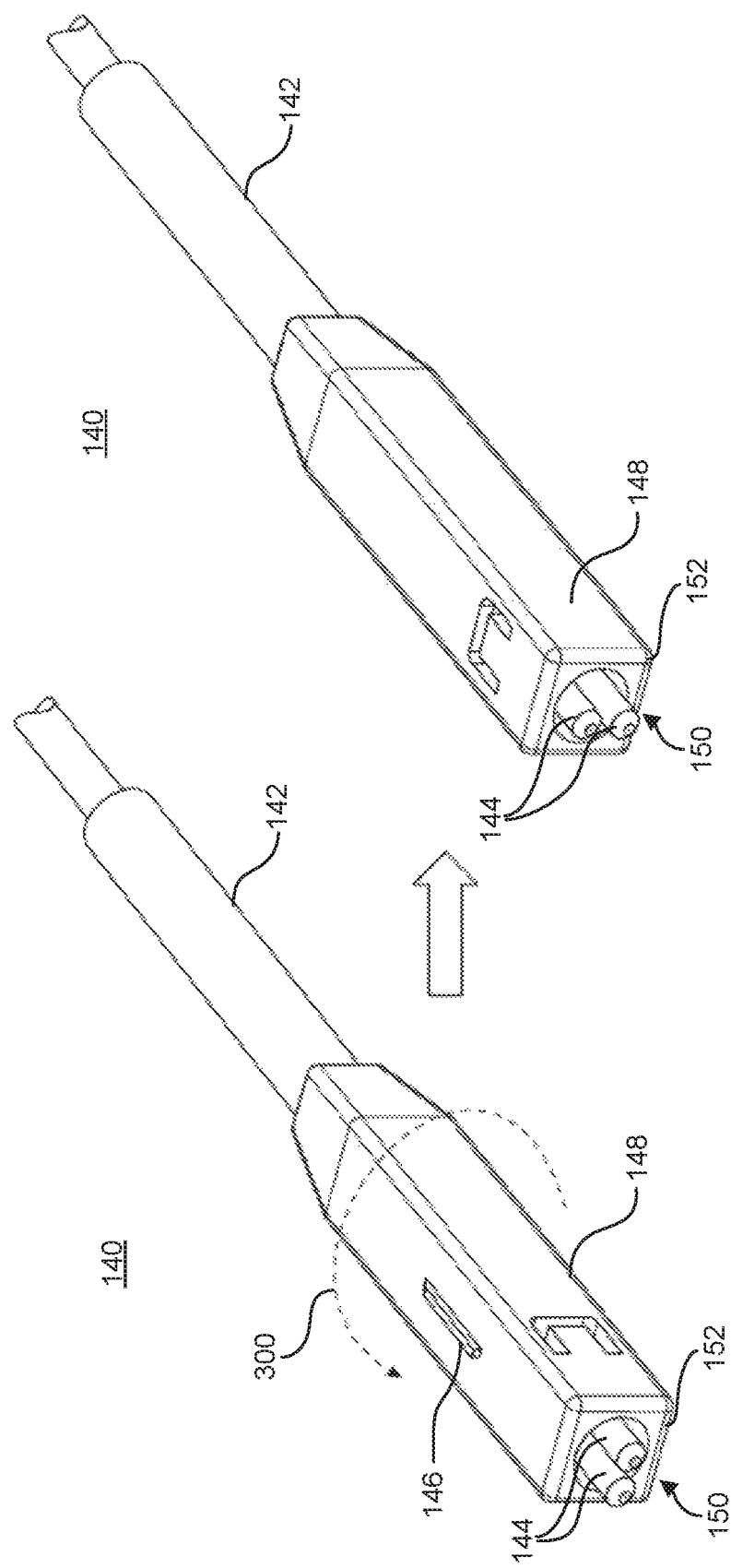

RECONFIGURABLE OPTICAL FERRULE CARRIER MATING SYSTEM

CROSS-REFERENCE TO RELATED APPLICATIONS

This application is a divisional application of and claims priority to application Ser. No. 16/362,464, filed on May 22, 2019, the contents of which is hereby incorporated by reference in its entirety.

BACKGROUND

Fiber optic transmission and photonic systems are utilized in data communication architectures for connecting different systems. The interconnections between different systems generally utilized active optical cables, which have built in electrical-to-optical conversion (i.e., transceivers) to extend the transmission distance of data over traditional electrical cables.

For mesh networking (or all-to-all connectivity), every node within the system is directly connected to all other nodes within the system. A node has multiple ports to connect to other nodes within the system. Traditionally, each connection within the mesh network comprise individual connections. As the mesh network scales, the number of individual connections required increases tremendously. To provide the all-to-all connectivity, optical fiber shuffles or interconnects are used to separate out the optical fibers of each connector so that each connector may be coupled to multiple optical connectors of different systems.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 3A is an example duplex ferrule connector in a serial orientation in accordance with embodiments of the technology disclosed herein.

FIG. 3B is an example duplex ferrule connector in a parallel orientation in accordance with embodiments of the technology disclosed herein.

Figure 1:
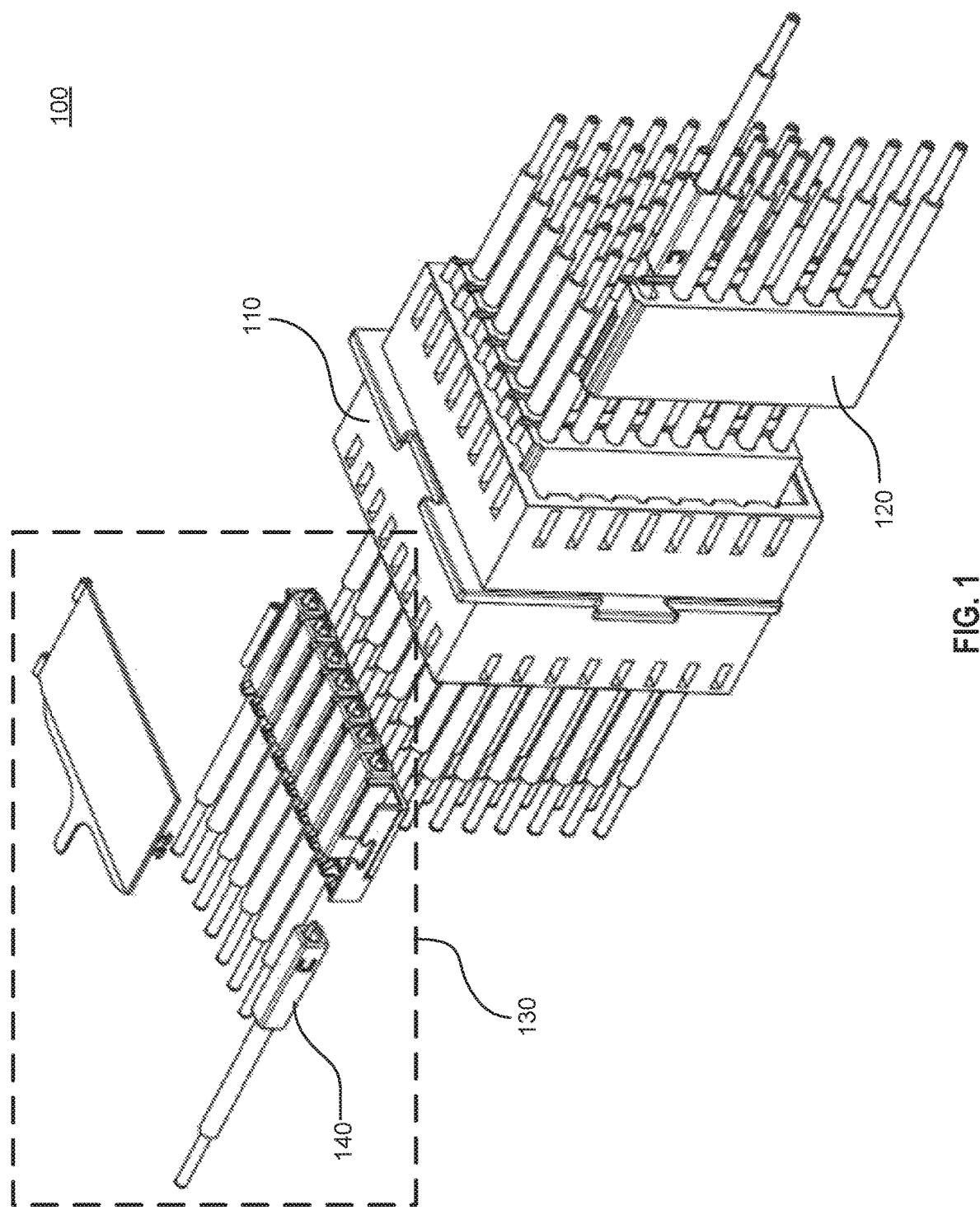
FIG. 1 illustrates an example of reconfigurable optical ferrule (ROF) carrier mating system in accordance with embodiments of the technology disclosed herein.

The figures are not exhaustive and do not limit the present disclosure to the precise form disclosed.

DETAILED DESCRIPTION

The need for individual connections to provide all-to-all connectivity in a mesh network hinder scalability. Active optical cables are expensive and bulky, having optical transceivers on each end of the cable, and also increase power consumption of the system as each cable draws power to operate the optical transceivers. As more nodes are added to the network, an even greater number of individual connections are required. One method of providing all-to-all connectivity is to convert parallel fiber ferrule cables (e.g., mechanical transfer (MT) connectors) to multiple duplex ferrule cables (e.g., Lucent Connector (LC) Duplex) within a fiber converter box. However, multiple fiber converter boxes are required to connect a large number of nodes, necessitating patch panels to be installed within a rack, or even one or more entire racks of boxes, all requiring multiple cable connections.

Additional optical fiber shuffles may also be required. An optical fiber shuffle is an assembly comprising multiple optical connectors on each end to provide many-to-many connectivity. Each optical fiber from an optical connector goes to multiple other optical connectors within the shuffle. Optical fiber shuffles may be manually constructed, requiring each fiber to be individually strung between the connectors. Other methods of constructing optical fiber shuffles include using a machine to perform the individual, one-by-one stringing method, programmatically laying down each fiber on an adhesive backing material to form an optical circuit assembly. Some implementations go so far as to provide robotic reconfiguration of connections.

All of these approaches, however, become less practical as the size of the network increases. Construction of the converter boxes, optical shuffles, or robotic management systems takes a long time to construct, requiring laying out fibers, cleaving ends, installing connectors, and other manufacturing steps. Moreover, each shuffle or converter box must be designed specifically for a given architecture. Not only does this add to the design process, but also results in large delays to the extent the configuration needs to change after the construction process has already begun. Converter boxes, optical fiber shuffles, and robotic management systems are all bulky, requiring a large amount of area. As discussed above, in some cases entire racks are required just to hold the connections required between the various converter boxes. Finally, each of these solutions are expensive. In some cases, an optical fiber shuffle may cost more than a node (e.g., network switch).

In addition to the scaling issues, requiring individual connections between components makes installation and maintenance costly and inefficient. Each separate connection requires its own cable, which (as mentioned above) are bulky. Not only is making all the connections time-consuming, but the size of the connectors can make installation difficult. This reduces the density capable within the system, requiring more racks and a greater physical area to implement the systems.

To address these issues, optical transceivers are increasingly being integrated into the systems themselves. Rather than requiring transceivers on the ends of each cable, the electrical-to-optical conversion is performed internally. However, this integration requires the passive fiber cables and optical fiber shuffles to also be integrated within the systems. Current internal cabling and fiber shuffles are relatively large, requiring several shuffle stages in order to connect properly with one or more application specific integrated circuits (ASICs) or other processing components of the system. These internal cabling solutions may be rather complex and expensive, increasing the cost of such implementations. Moreover, the current solutions get more complex when addressing inter-system connections (e.g., between rackmount devices), which require external, bulky optical fiber shuffles in additional boxes and rack cabinets, severely limiting density, as well as increasing the difficulty to install, service and reconfigure. Furthermore, additional connector stages may introduce degradation to overall system connection reliability and may limit high-speed optical signal performance.

Embodiments of the present disclosure address many of the drawbacks of current optical interconnection solutions. As discussed in detail below, embodiments of the technology disclosed herein provide a reconfigurable optical ferrule (ROF) carrier mating system which may be used as building blocks to implement both inter- and intra-system all-to-all connectivity. A duplex ferrule carrier is provided that can be configured in a "serial" or a "parallel" ferrule orientation. Using an ROF carrier adapter, a plurality of duplex ferrule carriers can be coupled in a number of different configurations, allowing for in-line or orthogonal mating of ROF carriers to provide intra-system all-to-all connectivity. Use of ROF carrier connectors in accordance with embodiments of the technology disclosed herein enable modular installations providing easier all-to-all connectivity within data centers without the need for expensive, implementation-specific fiber shuffle assemblies.

FIG. 1 is an example of ROF carrier mating system 100 in accordance with embodiments of the technology disclosed herein. ROF carrier mating system 100 is one example configuration of various embodiments of the present disclosure, and is presenting to provide an overview of the technology disclosed herein, including identifying the general components of ROF carrier mating system 100. Various different configurations and embodiments are discussed in greater detail below, and FIG. 1 should not be interpreted as limiting the scope of the subject matter to only the illustrated example.

As illustrated in FIG. 1, ROF carrier mating system 100 comprises an ROF carrier adapter 110, which may be utilized with parallel ferrule carriers (PFCs) 120 and/or serial ferrule carriers (SFCs) 130 in various configurations. Each side of ROF carrier adapter 100 may be carrier-type independent, meaning that each side of ROF carrier adapter 100 may accept either PFCs 120 or SFCs 130. In the illustrated example, ROF carrier adapter 110 is used to mate a plurality of SFCs 130 with a plurality of PFCs 120. Although illustrated in an SFC-PFC configuration, various embodiments may be in an SFC-SFC configuration, a PFC-SFC configuration, or a PFC-PFC configuration. Each carrier, PFC 120 or SFC 130, may be configured to house a plurality of duplex ferrule connectors 140 in respective orientations. The following description shall provide details about the different components of ROF carrier mating system 100.

Figure 2A:
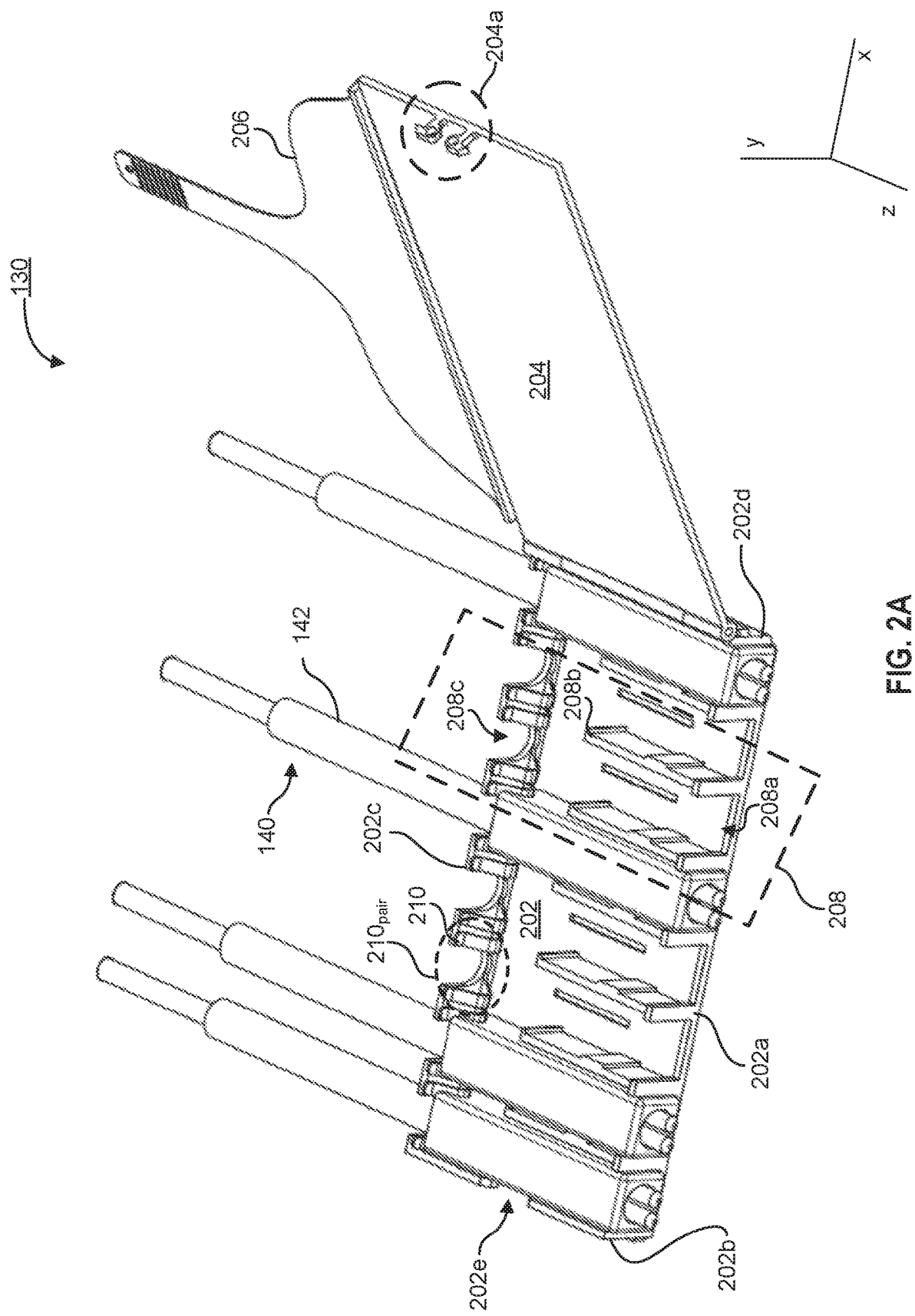
FIG. 2A is an example serial ferrule carrier (SFC) in accordance with embodiments of the technology disclosed herein.

FIG. 2A illustrates an example SFC 130 in a cover-open state in accordance with embodiments of the present disclosure. Although discussed with respect to SFC 130, the different components of the carrier discussed with reference to FIGS. 2A-2C apply equally to PFC 120. ROF carrier mating system 100 is designed to make reconfiguration easier, enabling high-density, low-cost, low-loss all-to-all "perfect shuffle" connectivity for both inter- and intra-system implementations. As explained in greater detail below, the difference between SFC 130 and PFC 120 depends on how duplex ferrule connectors 140 are installed within the carrier. That is, in various embodiments the same carrier can be reconfigured to act as either SFC 130 or PFC 120 by rotating each of the duplex ferrule connectors 140 included therein. Therefore, unless otherwise noted, the description of FIGS. 2A-2C should also be applied to PFC 120.

As illustrated, SFC 130 comprises a base 202 and a lid 204. Base 202 comprises four sides 202a, 202b, 202c, 202d defining an interior of SFC 130. In various embodiments, sides 202a, 202b, 202c, 202d may be extend upward from base 202 to a height equal to a height of duplex ferrule connector 140. In various embodiments, base 202 may comprise a plurality of ferrule bays 208. Ferrule bays 208 are configured to hold one duplex ferrule connector 140. In various embodiments, each ferrule bay 208 may include a bay opening 208a in front wall 202a of the base 202. A plurality of separators 208b may extend upwards from base 202 to separate each ferrule bay 208. In various embodiments, two separators 208b may define an interior of each ferrule bay 208, while side wall 202b may work with a separator to define the interior of the ferrule bay abutting side wall 202b and side wall 202d may work with a separator to define the interior of the ferrule bay abutting side wall 202d.

In various embodiments, one or more separators 208b may extend upward from base 202 to a height equal to the height of sides 202a, 202b, 202c, 202d or a height equal to the height of duplex ferrule connector 140. In other embodiments, one or more separators 208b may extend to height less than the height of sides 202a, 202b, 202c, 202d or a height less than to the height of duplex ferrule connector 140. As a non-limiting example, one or more separators 208b may extend to a height above base 202 that is equal to half the height of sides 202a, 202b, 202c, 202d or half the height of duplex ferrule connector 140. As another non-limiting example, one or more separators 208b may extend to a height above base 202 between 25%-75% of the height of sides 202a, 202b, 202c, 202d or the height of duplex ferrule connector 140. As illustrated in FIG. 2A, one or more separators 208b may extend from front wall 202a to a position less than the width of base 202. In other embodiments, one or more separators 208b may extend the width of base 202, from front wall 202a to back wall 202c.

SFC 130 further may include a plurality of carrier spring clips 210 disposed on back wall 202c. Each ferrule bay 208 may have a corresponding rear opening 208c in back wall 202c configured to provide clearance for optical cable 142 of duplex ferrule connector 140. Each carrier spring clip 210 on back wall 202c may provide a retention force to, a positive mating force for, and independent z-direction float for a duplex ferrule connector 140 within a ferrule bay 208. In various embodiments, each carrier spring clip 210 may be a separate component, two such carrier spring clips 210 associated with one ferrule bay 208. In other embodiments, one or more of carrier spring clips 210 may be connected to form a carrier spring clip pair $210_{pair}$. In some embodiments, each carrier spring clip pair $210_{pair}$ may be a separate component, in some embodiments two or more carrier spring clip pairs $210_{pair}$ may be combined as a single component, while in still other embodiments all the carrier spring clip pairs $210_{pair}$ may be combined as a spring clip pairs component stretching across the width of SFC 130 from side wall 202b to side wall 202d. Carrier spring clips 210 may be made of various materials, including but not limited to copper, aluminum, sheet metal, plastic, or other suitable retention material.

As illustrated in FIG. 2A, SFC 130 includes a lid 204 disposed on side wall 202d. Lid 204, when closed, serves to hold duplex ferrule connectors 140 within the interior of each ferrule bay 208, preventing movement in the y-direction. In various embodiments, lid 204 may include a carrier latch 204a configured to mate with a latch socket 202e disposed on side wall 202b. In other embodiments, lid 204 may be disposed on side wall 202b and latch socket 202e may be disposed on side wall 202d. Lid 204 may also include tab 206 dispatched on an edge corresponding to back wall 202c of base 202. In various embodiments, tab 206 may be a carrier securing feature configured to secure SFC 130 when installed in a socket. As illustrated in FIG. 2A, tab 206 is a push-pull tab style latch utilized in the field. In other embodiments, tab 206 may be any low-profile latching device used for securing communication cables within a communication port currently known, or any developed now or in the future, for use in high-density cabling installations. In some embodiments, tab 206 may be disposed on back wall 202c of base 202.

In various embodiments, lid 204 may have the same width and length of base 202. Although shown as a rectangle, in other embodiments, lid 204 may be have a different design. As a non-limiting example, in various embodiments lid 204 may include one or more cutouts on one or more edges and/or disposed on the surface of lid 204. Lid 204 may take on any design providing sufficient coverage of duplex ferrule connectors 140, and in some embodiments providing sufficient area for a tab 206 to be disposed. In various embodiments, lid 204 may include notations identifying one or more of ferrule bays 208 within SFC 130. As a non-limiting example, lid 204 may include a numeral (e.g., 1, 2, 3, etc.) identifying each of the eight (8) ferrule bays 208 of the example SFC 130. In some embodiments, the notations may include one or more symbols indicating one or more characteristics of the optical fiber and/or duplex ferrule connector 140 within each ferrule bay 208 (e.g., identifying duplex ferrule connectors 140 associated with different systems).

Figure 2B:
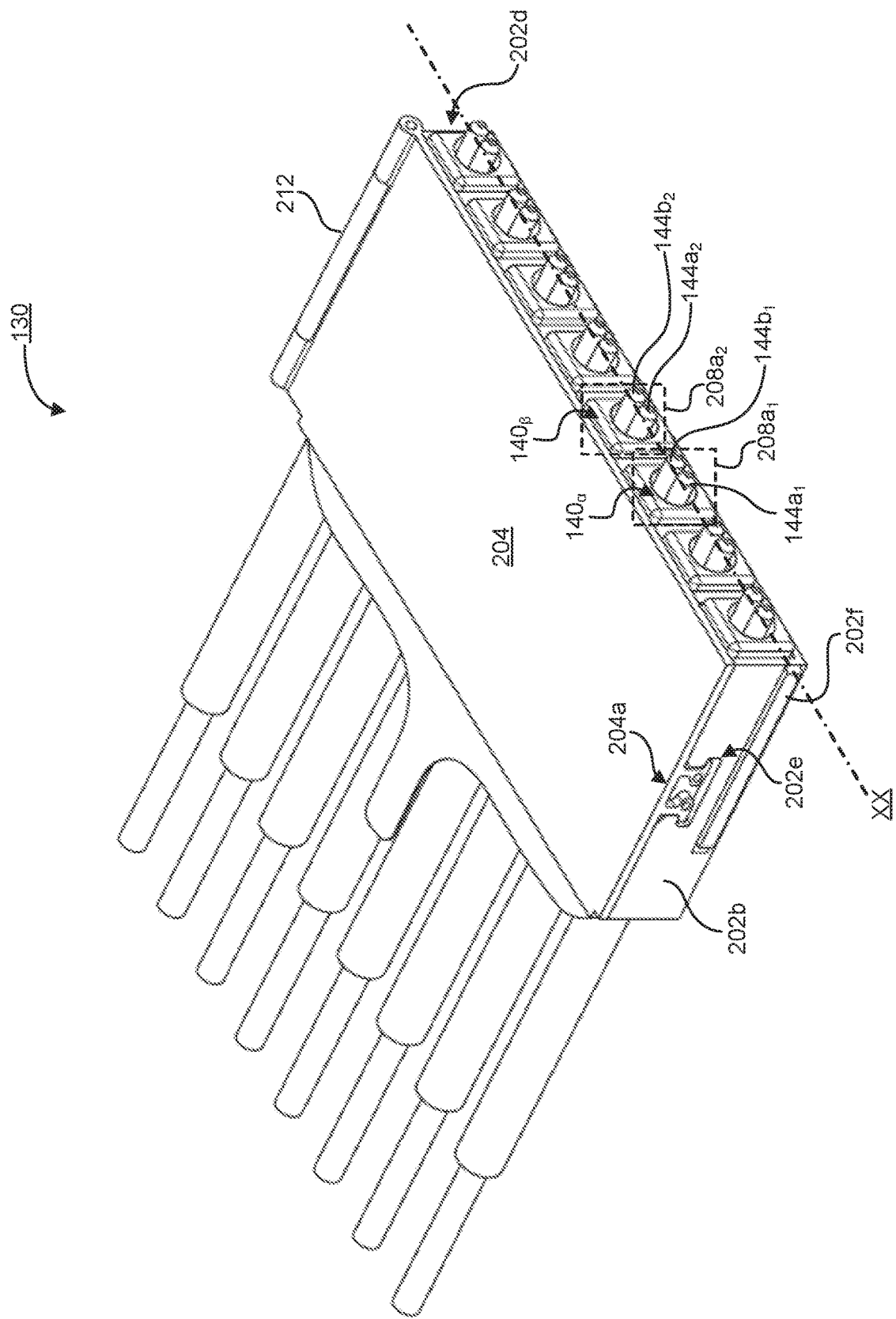
FIG. 2B is the example SFC of FIG. 2A in a closed position in accordance with embodiments of the technology disclosed herein.

FIG. 2B illustrates the example SFC 130 of FIG. 2A in a closed position, in accordance with various embodiments of the present disclosure. As shown in FIG. 2B, hinge 212 may be disposed on side wall 202d, coupling lid 204 to base 202 and allows lid 204 to pivot opened and closed. In the closed position, carrier latch 204a mates with the latch socket 202e disposed on side wall 202b. In some embodiments, side wall 202b may also include a slot rail 202f configured to assist in installing SFC 130 into a slot of ROF carrier adapter 110. A corresponding slot rail may also be disposed on side wall 202d in various embodiments. As illustrated in FIG. 2B, each ferrule $144a_1$, $144b_1$, $144a_2$, $144b_2$ of duplex ferrule connectors $140_\alpha$, $140_\beta$ extend out from each bay opening $208a_1$, $208a_2$ when SFC 130 is populated and lid 204 is closed. In some embodiments, ferrules $144a_1$, $144b_1$, $144a_2$, $144b_2$ may be independently floated along the z-axis within each duplex ferrule connector $140_\alpha$, $140_\beta$.

Figure 2C:
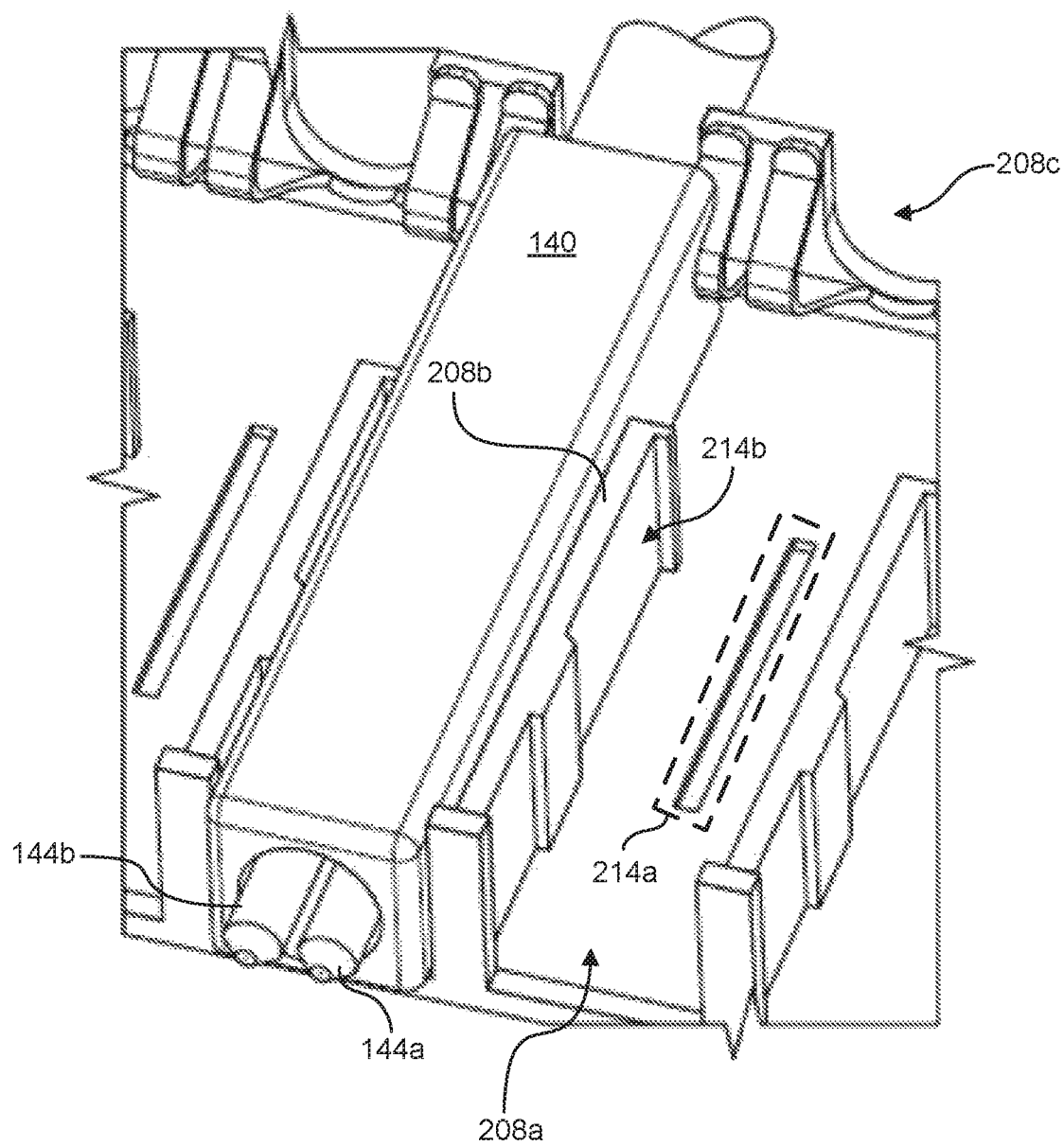
FIG. 2C is an example expanded view of ferrule bays of the SFC of FIG. 2A in accordance with embodiments of the technology disclosed herein.

FIG. 2C is an expanded view of ferrule bays 208 of SFC 130 in accordance with embodiments of the technology disclosed herein. As discussed earlier, each ferrule bay 208 is defined by bay opening 208a, separators 208b (and side walls 202b, 202d in some cases), and rear opening 208c. In various embodiments, each ferrule bay 208 may include one or more ferrule bay alignment features 214a, 214b. As discussed above, the difference between an SFC 130 and a PFC 120 is how each the duplex ferrule connectors 140 are installed within the carrier housing. Ferrule bay alignment features 214a, 214b may assist in ensuring that duplex ferrule connectors 140 are correctly installed for proper alignment for the intended nature of ferrules 144a, 144b (i.e., parallel or serial). In various embodiments, ferrule bay alignment features 214a, 214b may be configured to mate with one or more connector alignment feature 146 (as shown in FIG. 2D) of each duplex ferrule connector 140.

Figure 2D:
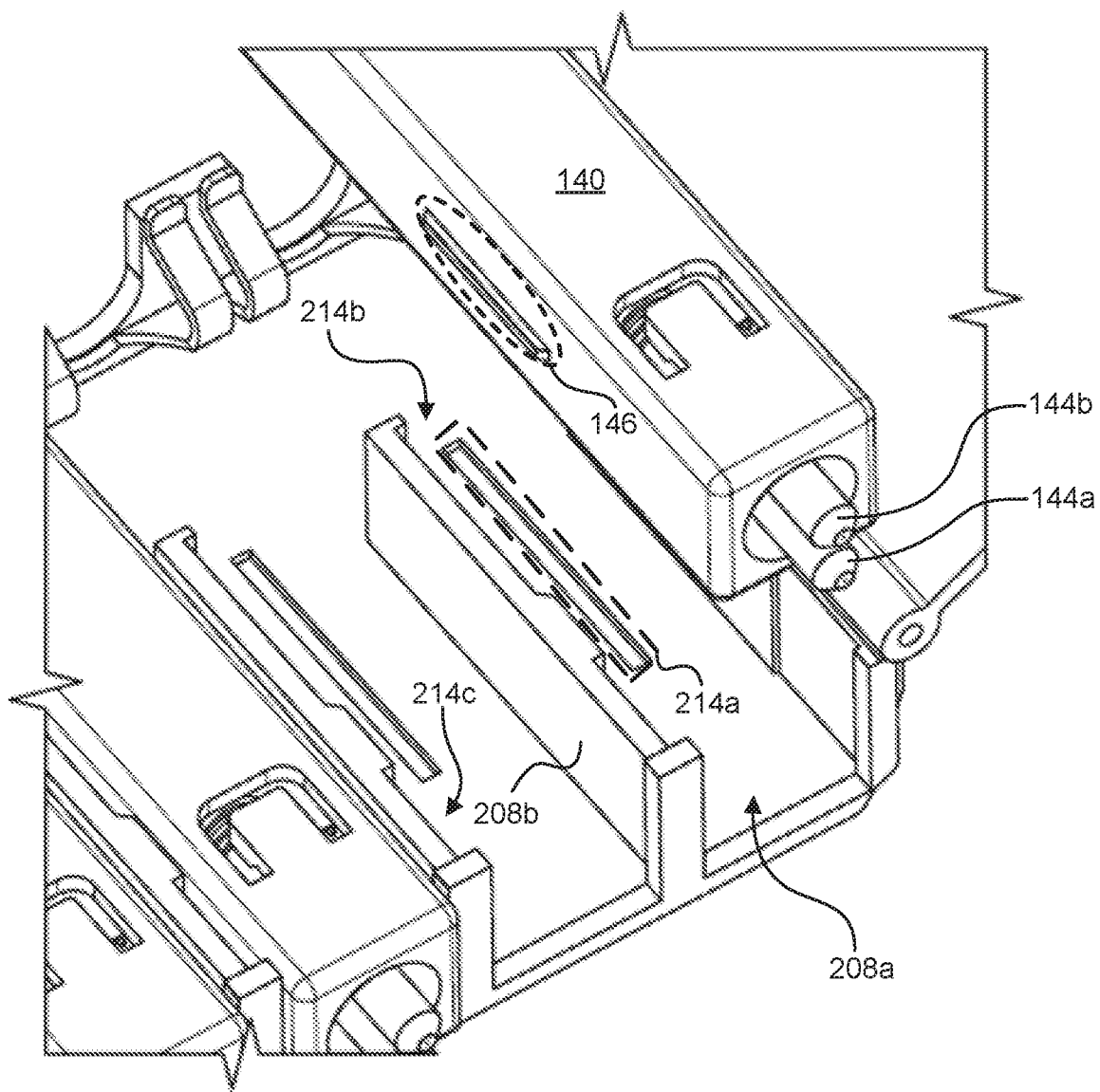
FIG. 2D is an example expanded view of ferrule bays of an example parallel ferrule carrier (PFC) in accordance with embodiments of the technology disclosed herein.

As illustrated in FIG. 2C, ferrule bay alignment feature 214a may be configured to mate with at least one connector alignment feature 146 such that ferrules 144a, 144b are arranged in a serial arrangement and parallel to base 202 (i.e., creating an SFC 130 as illustrated in FIG. 2C), while ferrule bay alignment feature 214b may be configured to mate with the same or one or more different connector alignment features 146 such that ferrules 144a, 144b are arranged in a parallel alignment and perpendicular to base 202 (i.e., creating a PFC 120 as illustrated in FIG. 2D). In various embodiments, serial ferrule bay alignment feature 214a may be configured to mate with a different one or more connector alignment features 146 of duplex ferrule connectors 140 than parallel ferrule bay alignment feature 214b. Ferrule bay alignment features 214a, 214b may be disposed anywhere within ferrule bays 208, such as (but not limited to) the opposite separator 208b, the length extending from bay opening 208a and rear opening 208c, across the width of ferrule bay 208, among others. In some embodiments connector alignment feature 146 may be a protruding rib and ferrule bay alignment features 214a, 214b may be recesses complimentarily shaped to accept connector alignment feature 146.

In various embodiments, ferrule bay alignment features 214a, 214b and/or connector alignment features 146 may be configured to maintain polarity during reconfiguration. When two ferrule carriers are mated (as discussed below with respect to FIGS. 5A-5C), it is important that the transmit ferrule of each duplex ferrule connector 140 in a first ferrule carrier mates with the receive ferrule of the corresponding duplex ferrule connector 140 in a second ferrule carrier. That is, the polarity of ferrules 144a, 144b in the first ferrule carrier is complementary to the polarity of ferrules 144a, 144b in the second ferrule carrier (e.g., ferrule 144a is transmit, ferrule 144b is receive). In various embodiments, ferrule bay alignment feature 214a may be configured to ensure duplex ferrule connectors 140 are inserted to create an SFC 130 and that ferrules 144a, 144b of each duplex ferrule connector 140 are oriented consistently, and ferrule bay alignment feature 214b may be configured to ensure duplex ferrule connectors 140 are inserted to create an PFC 120 and that ferrules 144a, 144b of each duplex ferrule connector 140 are oriented consistently. In other embodiments, the nature of each ferrule bay alignment feature 214a, 214b may be switched (i.e., ferrule bay alignment feature 214a associated with PFC 120, ferrule bay alignment feature 214b associated with SFC 130). As illustrated in greater detail with respect to FIGS. 5A-5C, in this way the proper polarity is maintained when two ferrule carriers are mated. As a non-limiting example, a single ferrule bay alignment feature 214a, and a single ferrule bay alignment feature 214b, may be disposed within each ferrule bay 208.

FIGS. 3A and 3B illustrates the reconfiguration of a duplex ferrule connector 140 in accordance with embodiments of the present disclosure. As shown, duplex ferrule connector 140 is configured such that, by simply rotating duplex ferrule connector 140 by 90° (as illustrated by dashed line 300, and by moving from a serial orientation (FIG. 3A) to a parallel orientation (FIG. 3B)) the same duplex ferrule connector 140 may be placed in a serial or a parallel configuration. Although illustrated as having a single connector alignment feature 146, in other embodiments a plurality of connector alignment features 146 may be disposed on the surface of the housing 148 of duplex ferrule connector 140. In some embodiments, duplex ferrule connector 140 may have a plurality of connector alignment features 146 disclosed on the same surface. As a non-limiting example, two connector alignment features 146 may be disposed on the same side of duplex ferrule connector 140, one connector alignment feature 146 to mate with a first ferrule bay alignment feature 214b, and the other connector alignment feature 146 to mate with a second ferrule bay alignment feature 214c. Similarly, ferrule bar alignment feature 214a may comprise two sections, each section configured to make with one of the two connector alignment features 146 of the prior non-limiting example.

Connector alignment feature 146 may be configured to ensure that polarity is maintained during reconfiguration. In various embodiments, connector alignment feature 146 may be disposed only on one side of duplex ferrule connector 140. As discussed above, ferrule bay alignment features 214a, 214b may be configured as complementary to connector alignment feature 146. Where connector alignment feature 146 is disposed on only one side surface of duplex ferrule connector 140, each duple ferrule connector 140 may only be installed in one position for a polarity for SFC or PFC configuration. In this way, the polarity orientation of each duplex ferrule connector 140 is consistent.

In various embodiments, each duplex ferrule connector 140 may comprise a housing 148 having a front opening 150 disposed on a front 152 of duplex ferrule connector 140. Two ferrules 144 may extend out through the front opening 150 in a serial orientation (FIG. 3A) of a parallel orientation (FIG. 3B). Although described with reference to the example duplex ferrule connector 140 illustrated in FIGS. 3A and 3B, the scope of the present disclosure is not limited to the specific construction illustrated. A person of ordinary skill in the art would understand that the technology of the present disclosure is applicable with any type of compact duplex ferrule designed to fit with ferrule bays 208.

Figure 4:
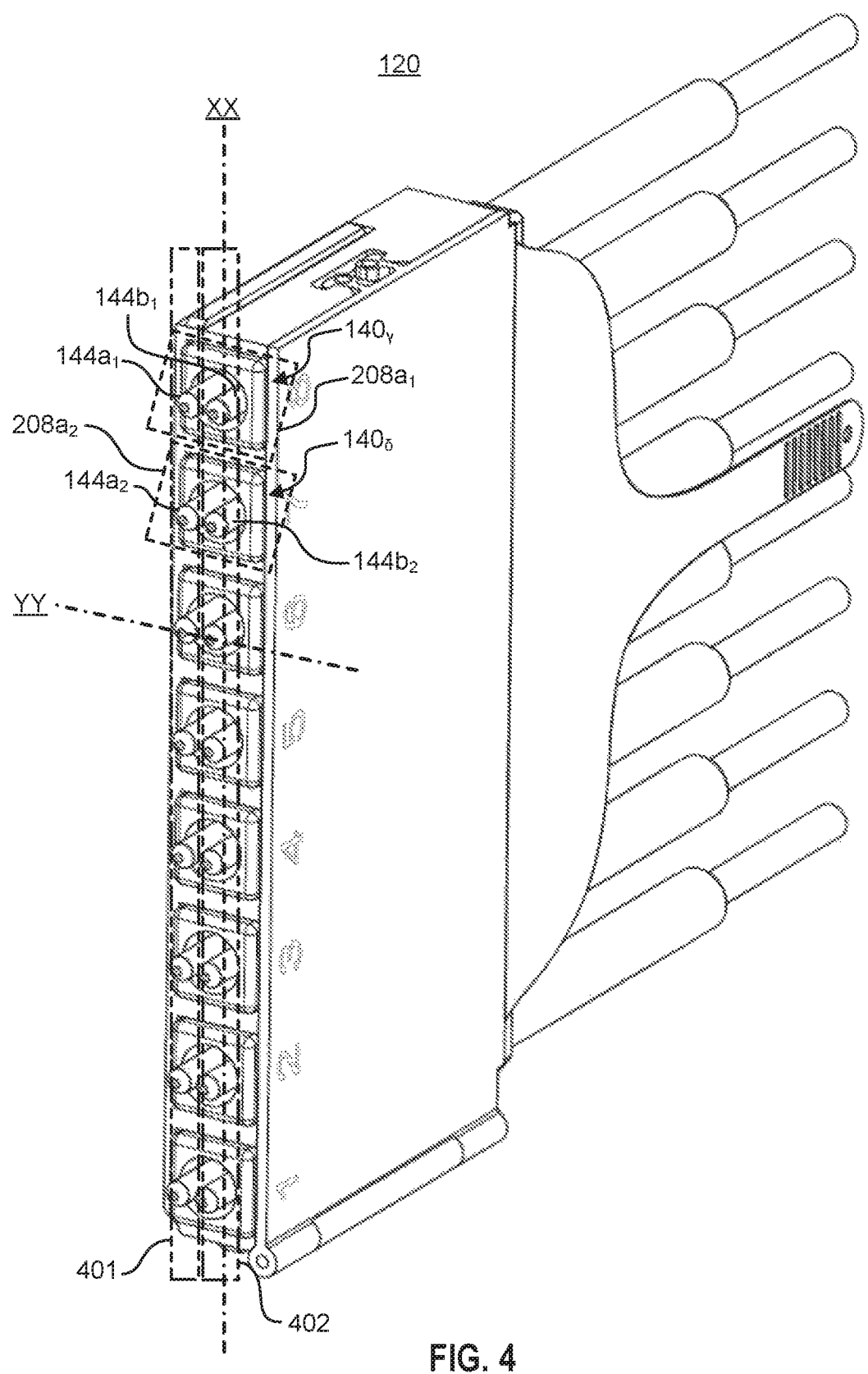
FIG. 4 illustrates an example PFC in accordance with embodiments of the technology disclosed herein.

FIG. 4 illustrates an example PFC 120 in accordance with embodiments of the present disclosure. As discussed above, in various embodiments PFC 120 differs from SFC 130 based on the orientation of duplex ferrule connectors 140 within a ferrule carrier. As illustrated SFC 130 in FIG. 2B, ferrules $144a_1$, $144b_1$, $144a_2$, $144b_2$ for each duplex ferrule connector $140_\alpha$, $140_\beta$ are arranged in a serial manner (i.e., all the ferrules are arranged in a straight line from side wall 202b to side wall 202d along axis XX). Each ferrule $144a_1$, $144b_1$, $144a_2$, $144b_2$ for each duplex ferrule connector $140_\alpha$, $140_\beta$ has a particular polarity, either configured to transmit an optical signal (i.e., a transmit ferrule) or receive an optical signal (i.e., a receive ferrule). As a non-limiting example, ferrules $144a_1$, $144a_2$ of each duplex ferrule connector $140_\alpha$, $140_\beta$ may be set as a transmit ferrule and ferrules $144b_1$, $144b_2$ of each duplex ferrule connector $140_\alpha$, $140_\beta$ may be set as a receive ferrule. When installed in an SFC 130, the straight line of ferrules 144a, 144b along axis XX comprises an alternating arrangement (e.g., transmit ferrule $144a_1$, receive ferrule $144b_1$, transmit ferrule $144a_2$, receive ferrule $144b_2$, etc.).

For PFC 120 in FIG. 4, ferrules $144a_1$, $144b_1$, $144a_2$, $144b_2$ for each duplex ferrule connector $140_\gamma$, $140_\delta$ in PFC 120 are arranged in a parallel manner (i.e., the ferrules are arranged such that the polarity of all ferrules within a column along the direction of axis YY are the same). As illustrated in FIG. 4, each ferrule $144a_1$, $144b_1$, $144a_2$, $144b_2$ for each duplex ferrule connector $140_\gamma$, $140_\delta$ extends out from ferrule bay opening $208a_1$, $208a_2$ in a stacked orientation (i.e. ferrule $144a_1$ is positioned in line with ferrule $144b_1$ along axis XX). Continuing the same non-limiting example discussed above with respect to FIG. 2B, the example PFC 120 of FIG. 4 illustrates that transmit ferrules $144a_1$, $144a_2$ of duplex ferrule connector $140_\gamma$, $140_\delta$ are arranged in a transmit polarity column 401, and the receive ferrules $144a_2$, $144b_2$ of duplex ferrule connector $140_\gamma$, $140_\delta$ are arranged in a receiver polarity column 402.

Figure 5A:
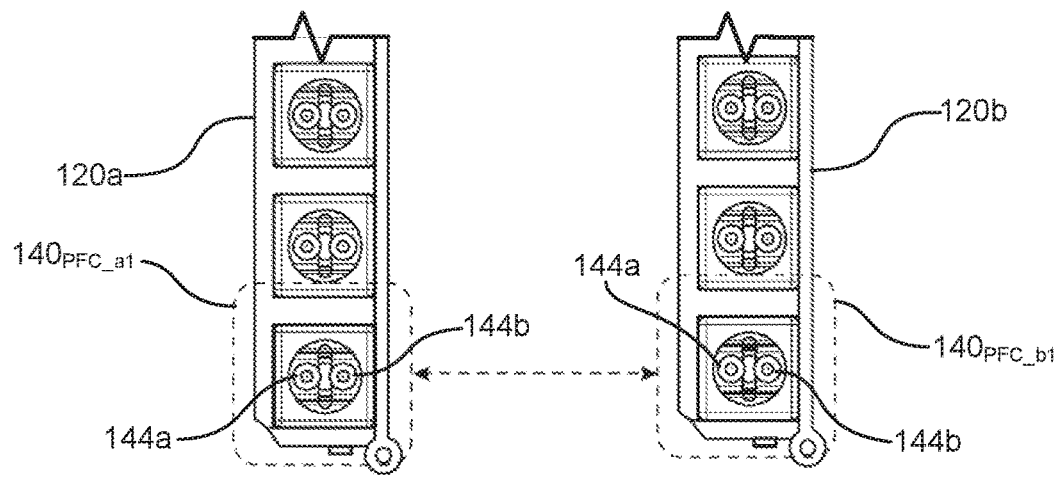
FIG. 5A is an example PFC-PFC configuration in accordance with embodiments of the technology disclosed herein.
Figure 5B:
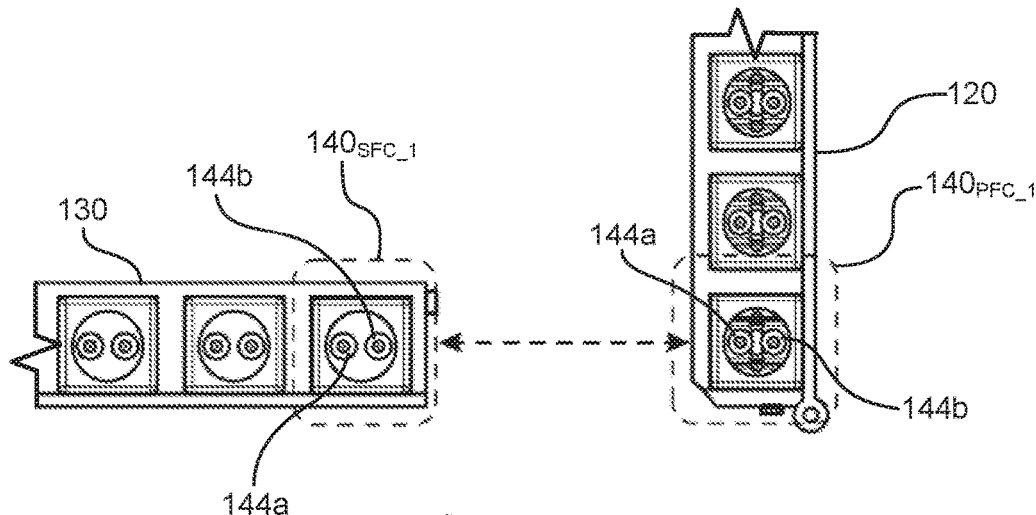
FIG. 5B is an example SFC-PFC configuration in accordance with embodiments of the technology disclosed herein.
Figure 5C:
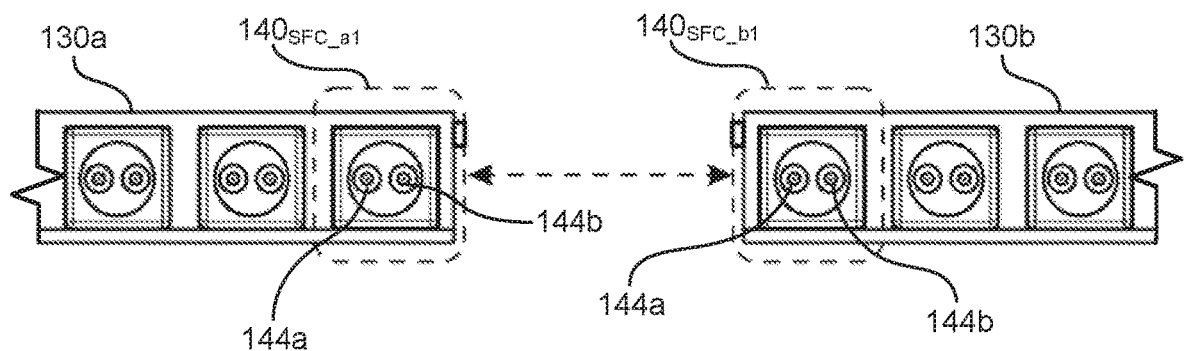
FIG. 5C is an example SFC-SFC configuration in accordance with embodiments of the technology disclosed herein.

The arrangement of ferrules 144a, 144b allow for easy configuration of SFCs 130 and/or PFCs 120 to meet implementation requirements. Embodiments of the present disclosure may be arranged in a number of different configurations, as illustrated in FIGS. 5A-5C. FIG. 5A illustrates an example PFC-PFC configuration in accordance with embodiments of the technology disclosed herein. As illustrated, when two PFCs 120a, 120b are connected, a first duplex ferrule connector $140_{PFC\_a1}$ of first PFC 120a is configured to mate with a first duplex ferrule connector $140_{PFC\_b1}$ of the second PFC 120b. In this way, transmit ferrule 144a of first duplex ferrule connector $140_{PFC\_a1}$ mates with a receive ferrule 144b of first duplex ferrule connector $140_{PFC\_b1}$, and receive ferrule 144b of first duplex ferrule connector $140_{PFC\_a1}$ mates with a transmit ferrule 144a of first duplex ferrule connector $140_{PFC\_b1}$. As illustrated in FIG. 5A, embodiments of the present disclosure implemented in a PFC-PFC configuration does not provide all-to-all connectivity. Rather, the PFC-PFC configuration results in in-line connectivity of each PFC 120. In this way, embodiments in the PFC-PFC configuration provides a flexible system configuration to extend fiber connection points, while allowing some-to-some connectivity.

FIG. 5B illustrates an example SFC-PFC configuration in accordance with embodiments of the present disclosure, where an SFC 130 is connected to a PFC 120. Although illustrated as an SFC-PFC configuration, the following description applies equally in a PFC-SFC configuration. As illustrated in FIG. 5B, in an SFC-PFC configuration, a first duplex ferrule connector $140_{SFC\_1}$ of SFC 130 is arranged to mate with a first duplex ferrule connector $140_{PFC\_1}$ of PFC 120. In this way, transmit ferrule 144a of first duplex ferrule connector $140_{SFC\_1}$ mates with a receive ferrule 144b of first duplex ferrule connector $140_{PFC\_1}$, and receive ferrule 144b of first duplex ferrule connector $140_{SFC\_1}$ mates with a transmit ferrule 144a of first duplex ferrule connector $140_{PFC\_1}$. As illustrated in FIG. 5B, embodiments of the present disclosure implemented in an SFC-PFC configuration provides all-to-all connectivity.

Figure 6A:
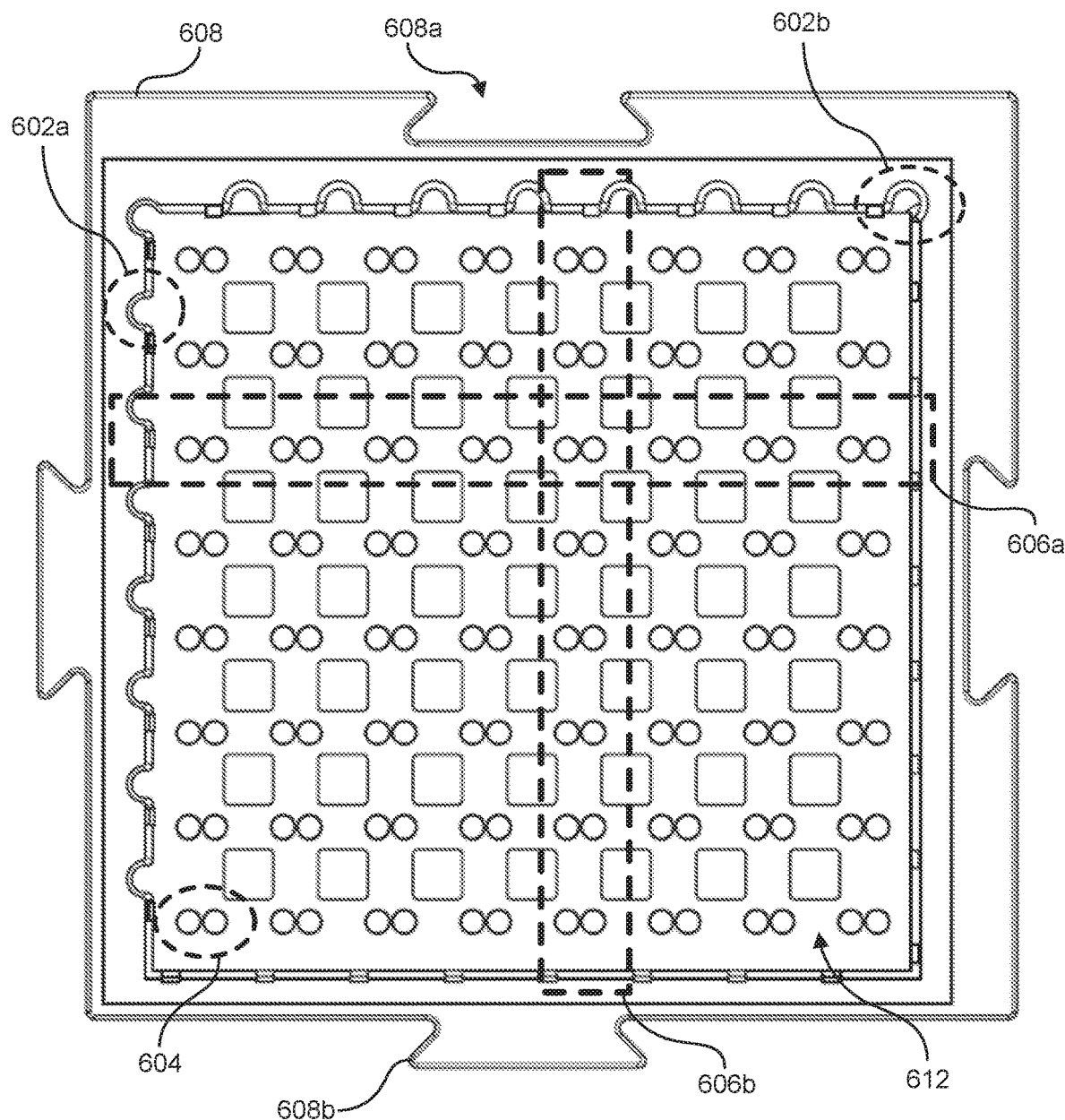
FIG. 6A is a front view of an example ROF carrier adapter in accordance with embodiments of the technology disclosed herein.

FIG. 5C illustrates an example SFC-SFC configuration in accordance with embodiments of the technology disclosed herein. As illustrated, when two PFCs 120a, 120b are connected, a first duplex ferrule connector $140_{PFC\_a1}$ of first PFC 120a is configured to mate with a first duplex ferrule connector $140_{PFC\_b1}$ of the second PFC 120b. In this way, transmit ferrule 144a of first duplex ferrule connector $140_{SFC\_a1}$ mates with a receive ferrule 144b of first duplex ferrule connector $140_{SFC\_b1}$, and receive ferrule 144b of first duplex ferrule connector $140_{SFC\_a1}$ mates with a transmit ferrule 144a of first duplex ferrule connector $140_{SFC\_b1}$. As illustrated in FIG. 5C, embodiments of the present disclosure implemented in a SFC-SFC configuration does not provide all-to-all connectivity. Rather, the SFC-SFC configuration results in in-line connectivity of each SFC 130. In this way, embodiments in the SFC-SFC configuration provides a flexible system configuration to extend fiber connection points, while allowing some-to-some connectivity As illustrated in FIG. 1, the ferrule carriers (i.e., PFC 120 and SFC 130) may be connected through ROF carrier adapter 110. FIG. 6A is a front view of an example ROF carrier adapter 110 in accordance with embodiments of the technology disclosed herein. As illustrated, ROF carrier adapter 110 may comprise a plurality of carrier keying features 602 along an interior of ROF carrier adapter 110. In various embodiments, carrier keying features 602 may be configured to mate with a corresponding carrier alignment feature of PFC 120 and/or SFC 130. Hinge 212 of PFC 120 and/or SFC 130 (discussed with respect to FIG. 2A) may comprise the corresponding carrier alignment feature configured to mate with a carrier keying feature 602 in some embodiments. In other embodiments, the carriers may include a separate carrier alignment feature (not shown in FIGS. 2A-2D) configured to mate with one or more carrier keying features 602 of ROF carrier adapter 110.

In various embodiments, carrier keying features 602a, 602b may be disposed on both sides of an adapter mid-wall 612. Adapter mid-wall 612 may serve to divide ROF carrier adapter 110 into two sides, each side comprising a carrier receptacle configured to accept a plurality of PFC 120 and/or SFC 130. In various embodiments, adapter mid-wall 612 may comprise a 2D array of ferrule mating sleeves 604. Each ferrule mating sleeve 604 may be configured to accept a ferrule, enabling a final alignment feature for the ferrules from duplex ferrule connectors on either side of adapter mid-wall 612 to mate. In various embodiments, a pair of ferrule mating sleeves 604 may be configured to align with ferrules extending out from a ferrule bay opening of an ROF carrier (either SFC or PFC) such that, when the ROF carrier is inserted into ROF carrier adapter 110, each ferrule is inserted into one of ferrule mating sleeves 604. In some embodiments, individual simplex ferrule 144 may be floated within ferrule connector 140. Individual simplex ferrules 144 in ferrule connectors 140, installed in PFCs 120 and/or SFCs 130 with positive mating force provided by carrier spring clips 210 (FIG. 2A), mated with tight tolerances within ferrule mating sleeves 604 in ROF carrier adapter 110 enables low optical signal loss.

Figure 6B:
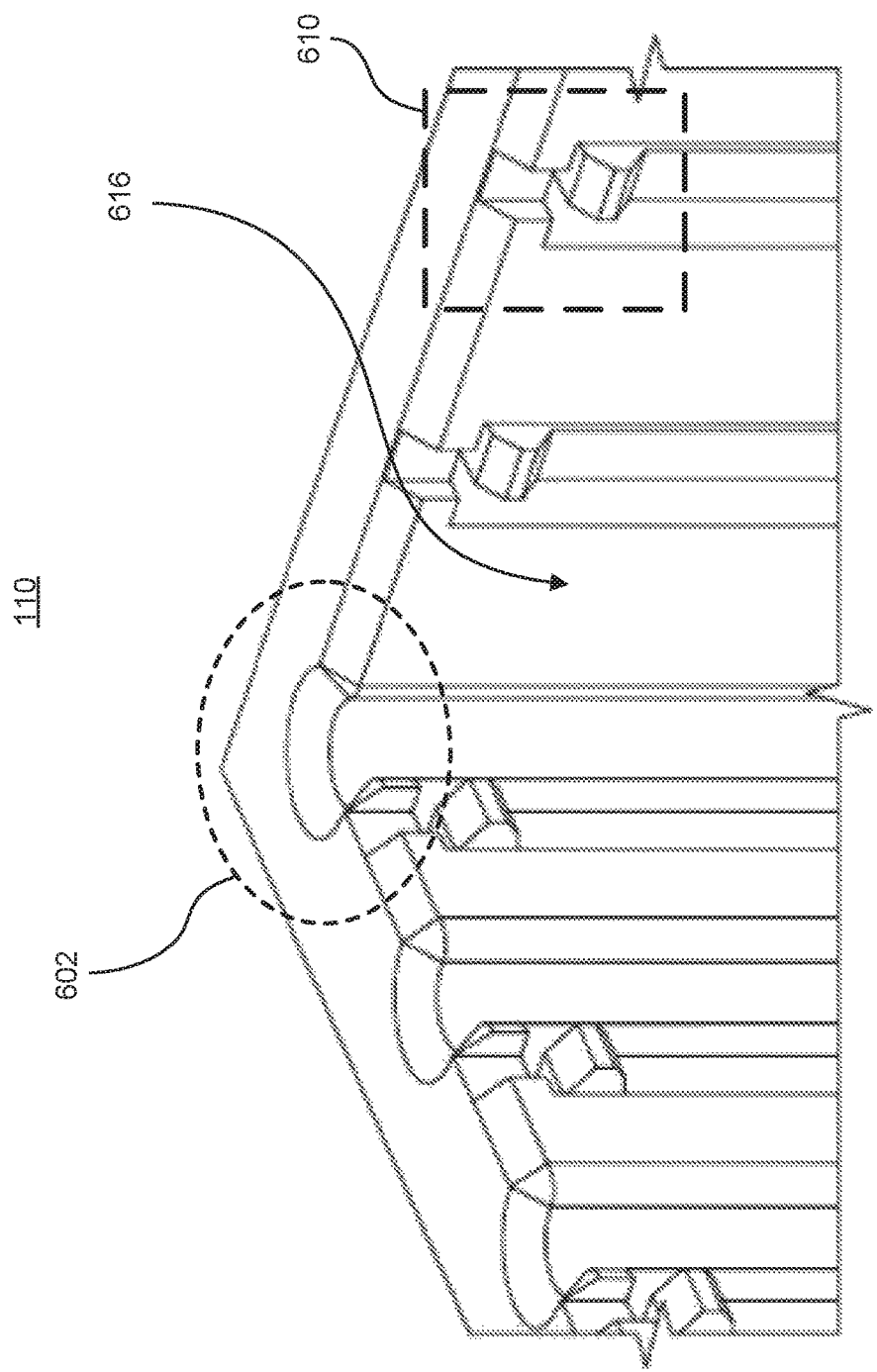
FIG. 6B is an expanded view of the interior of the example ROF carrier adapter of FIG. 6A in accordance with embodiments of the technology disclosed herein.
Figure 6C:
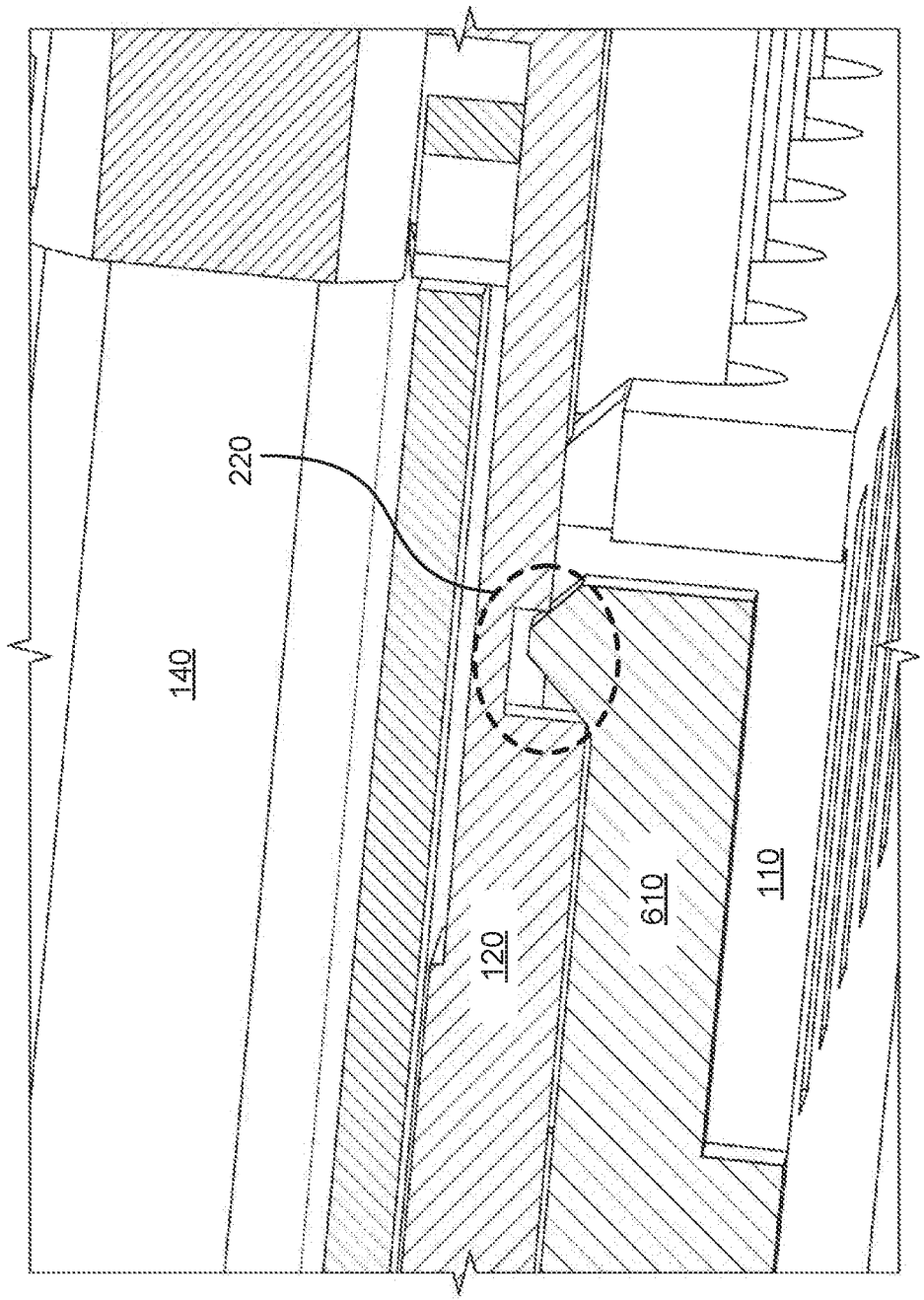
FIG. 6C is a cross-sectional view of the ROF carrier adapter of FIG. 6A showing a ferrule retention feature in accordance with embodiments of the technology disclosed herein.
Figure 6D:
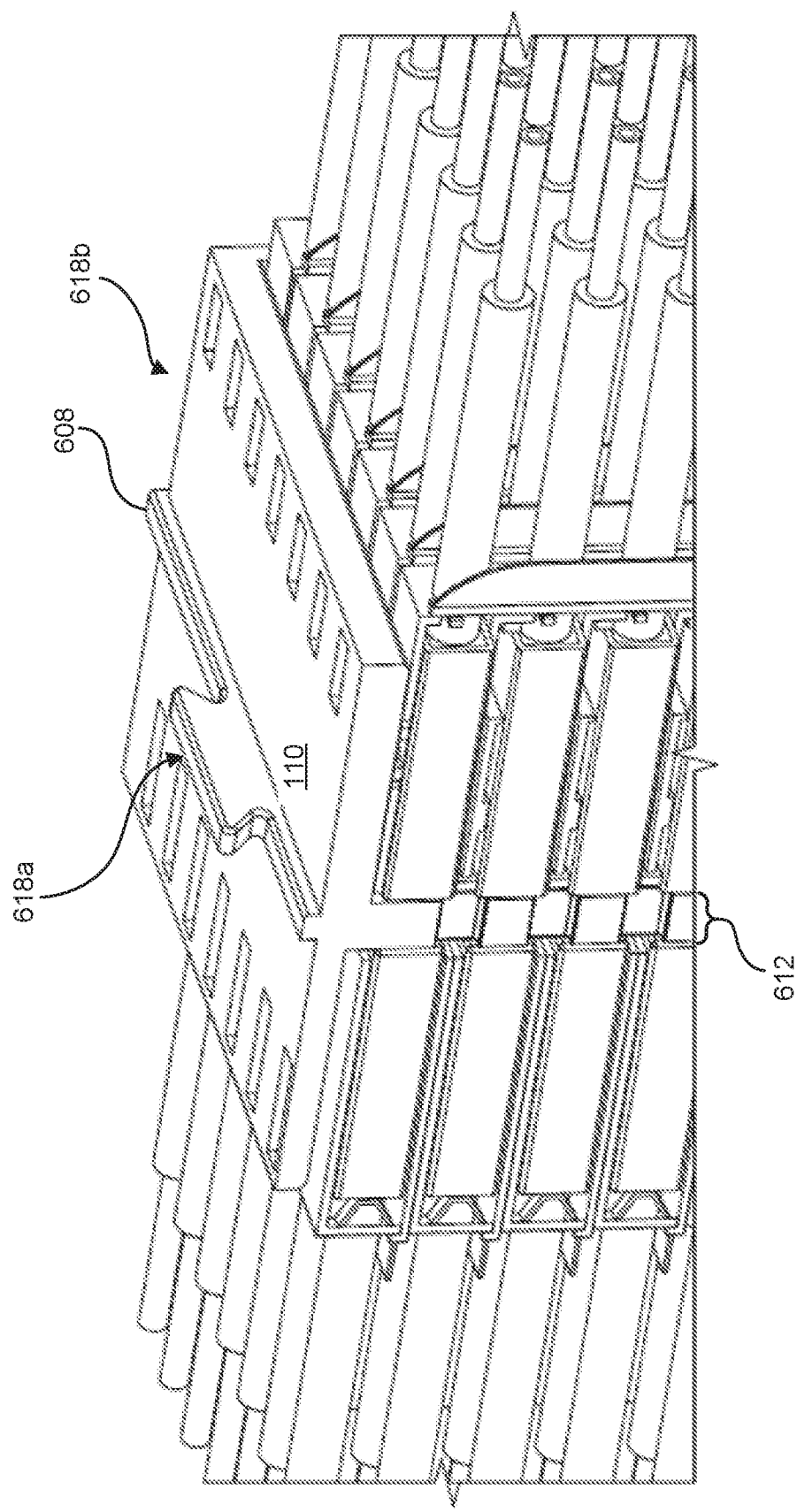
FIG. 6D is another cross-sectional view of the ROF carrier adapter of FIG. 6A showing the adapter mid-wall in accordance with embodiments of the technology disclosed herein.

As illustrated in FIG. 6D, adapter mid-wall 612 separates ROF carrier adapter 110 into two sides, a first carrier receptacle 618a and a second carrier receptacle 618b. In various embodiments, first carrier receptacle 618a and second carrier receptacle 618b may be configured such as the carrier receptacle discussed above with respect to FIG. 6A. As illustrated in FIG. 6D, each carrier receptacle 618a, 618b is configured to accept a plurality of carriers (SFC or PFC) in one of two orientations. The front wall of each carrier couples to adapter mid-wall 612 such that the ferrules of the duplex ferrule connectors within the first carrier receptacle 618a are inserted within ferrule mating sleeves to mate with ferrules of duplex ferrule connectors within the second carrier receptacle 618b. In various embodiments, adapter mid-wall 612 may have a width such that, when the ferrules are mated through the plurality of ferrule mating sleeves, a front wall of the carrier (SFC or PFC) and/or the front of each duplex ferrule connector abuts the adapter mid-wall 612. In other embodiments, adapter mid-wall 612 may have a smaller width with one or more projections configured to abut the front wall of each carrier.

To facilitate reconfigurability, the interior (interior 616 illustrated in FIG. 6B) of ROF carrier adapter 110 may be open, lacking dividers between rows or columns of ferrule mating sleeves 604. As illustrated in FIG. 6A, a carrier (SFC or PFC) may be inserted into ROF carrier adapter 110 in a horizontal orientation 606a or a vertical orientation 606b. In various embodiments, orthogonal mating between an SFC and a PFC is facilitated by inserting the SFCs in a horizontal orientation 606a on one side of ROF carrier adapter 110, and inserting the PFCs in a vertical orientation 606b on the opposite side of ROF carrier adapter 110. In this way, each PFC may have a connection with each of the SFCs in ROF carrier adapter 110. Although illustrated as an 8×8 matrix (i.e., having eight horizontal orientation 606a slots or eight vertical orientation 606b slots), in other embodiments ROF carrier adapter 110 may include fewer slots configured to accept a carrier (i.e., PFC 120, SFC 130) with accordingly fewer number of duplex ferrules. In some other embodiments, a greater number of slots may be included with accordingly greater number of duplex ferrules. As a non-limiting example, ROF carrier adapter 110 may comprise a 6×6 matrix, meaning that each side of ROF carrier adapter 110 may accept six carriers (in either PFC or SFC configuration) where each PFC 120 or SFC 130 holding six duplex connectors 140. A person of ordinary skill in the art would appreciate that the subject matter is not limited to a particular size, but ROF carrier adapter 110 may be sized as required for a given implementation.

As illustrated in FIG. 6B, a plurality of carrier retention features 610 disposed within the interior 616 of ROF carrier adapter 110. Carrier retention features 610 may be configured to secure each ROF carrier (e.g., SFC 130 or PFC 120 discussed with respect to FIGS. 1 and 2A-D). An example of how carrier retention feature 610 interacts with an example carrier (i.e., PFC 130) is illustrated in FIG. 6C. FIG. 6C is a cross sectional view of ROF carrier adapter 110. As shown, carrier retention feature 610 is configured to mate with a carrier securing feature 220 of PFC 120. In various embodiments, carrier securing feature 220 may be disposed on base 202 and/or lid 204 of PFC 120. Carrier retention features 610 may be disposed such that each carrier retention feature 610 is configured to mate with a carrier securing feature 220 on base 202 or lid 204 of PFC 120. In various embodiments, carrier retention feature 610 may be a latch and carrier securing feature 220 may be an opening (as illustrated in FIG. 6D) such that, when installed into ROF carrier adapter 110, carrier retention feature 610 couples to carrier securing feature 220. Carrier retention features 610 may be configured to provide sufficient bias on PFC 120 to maintain PFC 120 properly installed within ROF carrier adapter 110. In various embodiments, ROF carrier adapter 110 may include a carrier release (not shown in FIG. 6C) configured to uncouple carrier retention feature 610 from carrier securing feature 220 of PFC 120. In some embodiments, a separate carrier release may be provided for each carrier retention feature 610 such that each carrier (e.g., PFC 120) may be decoupled from ROF carrier adapter 110 individually, while in other embodiments a carrier release may be configured to control one or more carrier retention features 610. In some embodiments, tab 206 (not shown in FIG. 6C) may be configured to decouple carrier securing feature 220 of PFC 120 from carrier retention feature 610.

As mentioned above, embodiments of the technology disclosed herein provides for modular installation for "perfect shuffle" providing "all-to-all" connectivity in a low-cost, low-loss, high density manner. In various embodiments, ROF carrier adapters 110 may be connected together, enabling more optical fibers to be communicatively coupled together in an easier to reconfigure arrangement. As illustrated in FIG. 6A, ROF carrier adapter 110 may include an adapter mating surface 608 for mounting ROF carrier adapters 110 in the system. In various embodiments, adapter mating surface 608 may comprise a raised rim along the exterior of each ROF carrier adapter 110 (as illustrated by adapter mating surface 608 in FIG. 6D). Adapter mating surface 608 may include one or more gendered mounting structures, such as female mounting structure 608a and male mounting structure 608b. Each gendered mounting structure may be configured to couple with a corresponding gendered mounting structure of an ROF carrier adapter bracket, such as example ROF carrier adapter bracket 702 illustrated in FIG. 7A. When an ROF carrier adapter 110 is mounted using ROF carrier adapter bracket 702, female mounting structure 608a of ROF carrier adapter 110 mates with male mounting structure 702b of ROF carrier adapter bracket 702, and male mounting structure 608b of ROF carrier adapter 110 mates with female mounting structure 702a of ROF carrier adapter bracket 702. In various embodiments, each ROF carrier adapter 110 may be mounted within a system using a separate ROF carrier adapter bracket 702.

Figure 7A:
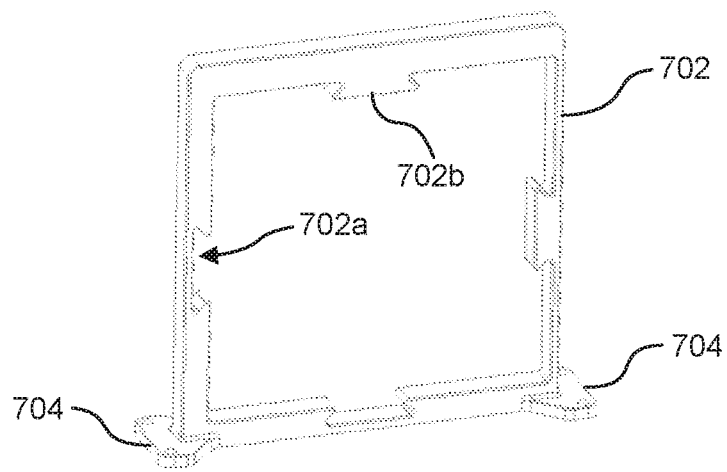
FIG. 7A illustrates an example ROF carrier adapter bracket in accordance with embodiments of the technology disclosed herein.

In various embodiments, ROF carrier adapter bracket 702 may include one or more system mounts 704, configured to connect ROF carrier adapter bracket 702 to one or more structures of a system in which the ROF carrier mating system of the present disclosure may be implemented. Although illustrated in FIG. 7A as system mounts 704 being disposed on a base of ROF carrier adapter bracket 702, the position of system mounts 704 should not be interpreted as being limited to only such an arrangement. A person of ordinary skill in the art would understand that the location of system mounts 704 would be determined based on the particular system in which the bracket 702 is to be connected. As a non-limiting example, one or more system mounts 704 may be disposed on a base of ROF carrier adapter bracket 702 (as illustrated in FIG. 7A) as well as on a side of ROF carrier adapter bracket 702. Moreover, although ROF carrier adapter bracket 702 is illustrated in a square shape, other embodiments may take on different exterior shapes based on the form of the system to which ROF carrier adapter bracket 702 is to be connected.

Figure 7B:
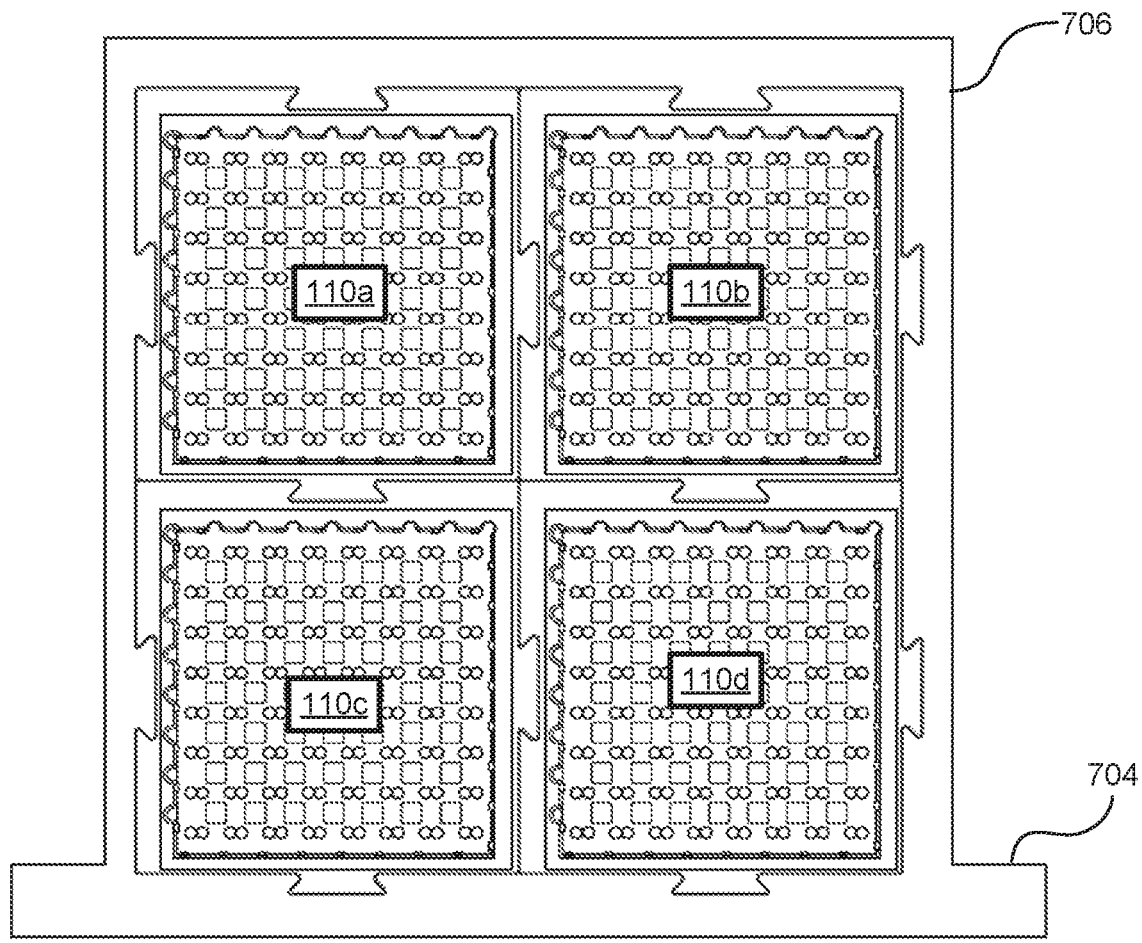
FIG. 7B illustrates an example 2×2 matrix of ROF carrier adapters within a cascading ROF carrier adapter bracket in accordance with embodiments of the technology disclosed herein.

The modular nature of embodiments of the technology disclosed herein enables multiple ROF carrier adapters 110 to be connected together to form a connection wall in a variety of different configurations. Each ROF carrier adapter 110 may be connected together in a similar manner as connecting an ROF carrier adapter 110 to ROF carrier adapter bracket 702, with one or more mounting structures 608a, 608b of a first ROF carrier adapter 110 mating with corresponding one or more mounting structure 608a, 608b of a second ROF carrier adapter 110. As a non-limiting example, four ROF carrier adapters 110a, 110b, 110c, 110d connected together to form a cascading ROF carrier structure in a 2×2 matrix is illustrated in FIG. 7B. As illustrated, the four ROF carrier adapters, 110a, 110b, 110c, 110d essentially form a larger version of ROF carrier adapter 110, providing four times the number of optical fiber connections in four all-to-all connected groups. By nodes having multiple ports, and each port connected to an all-to-all connected group, the number of node count can be multiplied for overarching all-to-all connected. In various embodiments, a cascading ROF carrier adapter bracket 706 may be used to mount the 2×2 matrix of ROF carrier adapters 110a, 110b, 110c, 110d within the system. In various embodiments, cascading ROF carrier adapter bracket 706 may include system mounts 704, similar to the system mounts 704 discussed with respect to FIG. 7A. The size and shape of cascading ROF carrier adapter bracket 706 may vary depending on the number of ROF carrier adapters 110 connected together and the shape of the arrangement. As a non-limiting example, ROF carrier adapters 110a, 110b, 110c, 110d may be arranged in an L-shape (e.g., ROF carrier adapter 110c may be connected to the right side of ROF carrier adapter 110b, and ROF carrier adapter 110d may be connected to the bottom of ROF carrier 110c), and cascading ROF carrier adapter bracket 706 may have a similar shape to support ROF carrier adapters 110a, 110b, 110c, 110d.

ROF carrier adapter 110 provide intra-system or inter-system "all-to-all" connectivity by using duplex optical cables, but the technology disclosed herein is applicable for inter-system direct connectivity as well by using blind-mate connectors.

Figure 8A:
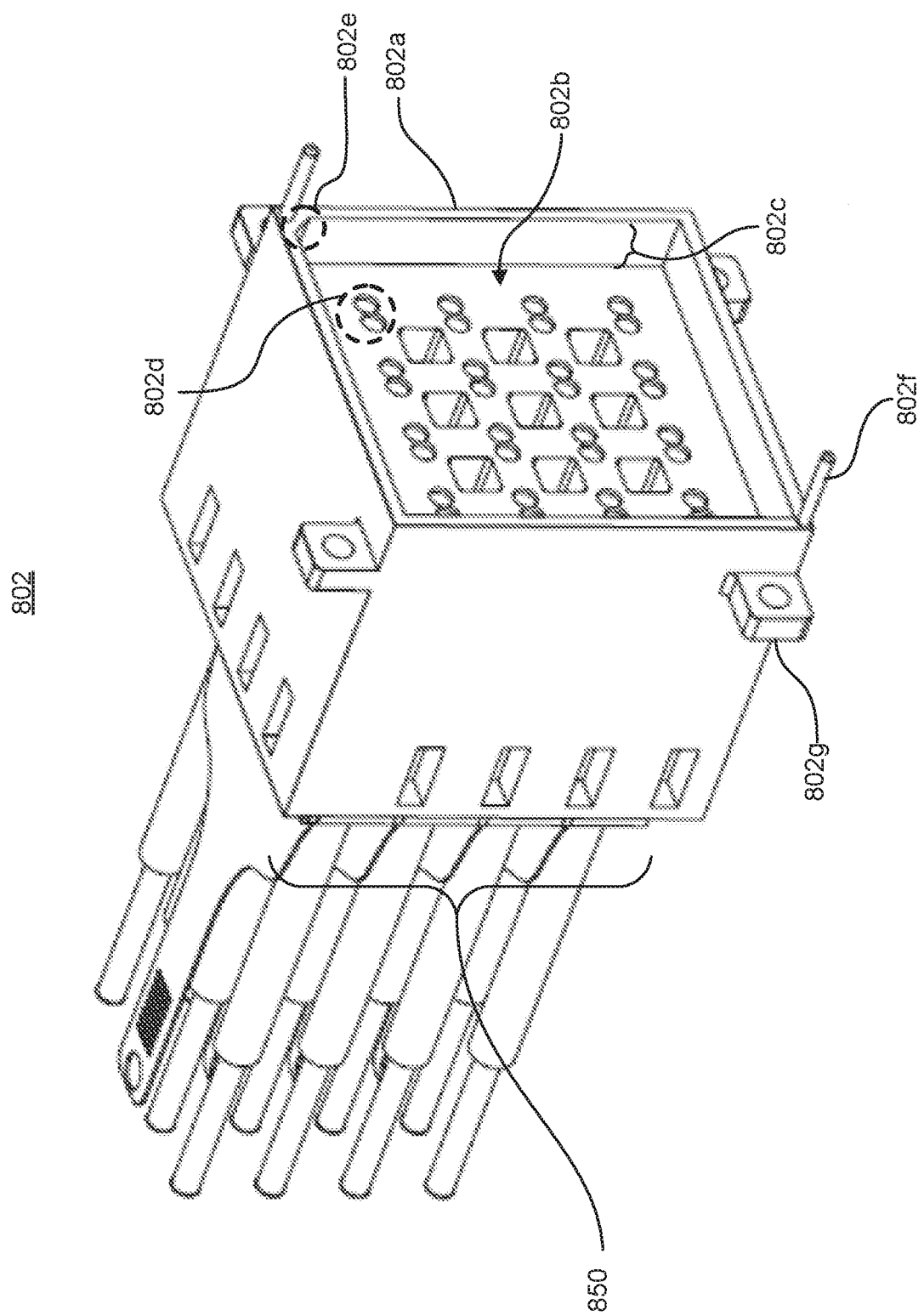
FIG. 8A is an example receptacle ROF blind-mate connector in accordance with embodiments of the technology disclosed herein.

FIG. 8A illustrates an example ROF blind-mate receptacle 802 in accordance with embodiments of the technology disclosed herein. Receptacle ROF blind-mate connector 802 has two sides—a mating side and a ferrule carrier side, separated by a dividing wall similar to the adapter mid-wall 612 discussed with respect to FIGS. 6A and 6B. The ferrule carrier side is not presented to the viewer in the perspective view of FIG. 8A. As illustrated, a plurality of ferrule carriers 850 are inserted into the ferrule carrier side (i.e., ferrule carriers 850 are connected in a manner similar to the connection method discussed with respect to FIGS. 6A and 6B). Ferrule carriers 850 may comprise a plurality of PFCs or a plurality of SFCs, depending on the design of the particular implementation. In various embodiments, the interior of the ferrule carrier side may be configured similar to the interior of 616 of ROF carrier adapter 110 discussed above with respect to FIGS. 6A-6D.

Mating side of a ROF blind-mate receptacle 802 comprises a receptacle opening 802a. In various embodiments, receptacle opening 802a may include one or more lead-in features (not shown in FIG. 8A), configured to accept a protrusion on a complementary plug (e.g., ROF blind-mate plug 804 discussed below with respect to FIGS. 8C and 8D). In various embodiments, the one or more lead-in features may be disposed along an interior surface of receptacle opening 802a. In various embodiments, the lead-in features may be one or more lead-in features commonly used in the field.

In some embodiments, receptacle opening 802a may include a receptacle keying feature 802e, disposed at a corner of receptacle opening 802a. Receptacle keying feature 802e may be a feature on an inside surface of receptacle opening 802a configured to mate with a corresponding feature on a protrusion of the complementary plug, ensuring that the intended configuration is maintained, regardless of the rotational position of ROF blind-mate receptacle 802 and its complementary plug (to be discussed with respect to FIG. 8B). In some embodiments, guide features 802f may be configured to assist in aligning the blind-mate connectors during installation (as illustrated in FIG. 9). As illustrated, guide features 802f comprise two guide rods, each extending outward from face 802a. In various embodiments, guide features may extend outward from another surface of ROF blind-mate receptacle 802.

As illustrated, ROF blind-mate receptacle 802 may comprise a face 802b recessed within the receptacle opening 802a. Receptacle opening 802a extends outward from face 802b, forming an interior cavity 802c. In various embodiments, face 802b may have a plurality of openings 802d configured to allow ferrules of the plurality of ferrule connectors (not shown in FIG. 8A) in ferrule carriers 850 to sit within sleeves 604. Essentially, face 802b may be configured to in a manner similar to adapter mid-wall 612 discussed with respect to FIGS. 6A-6D. Like adapter mid-wall 612, face 802a may have a width W (not shown in FIG. 8A), allowing each ferrule of the inserted ferrule carriers 850 to sit recessed within face 802b and in a position for mating with the respective ferrules of the complementary plug (e.g., ROF blind-mate plug 804).

ROF blind-mate receptacle 802 may further include one or more mounting brackets 802g configured for securing ROF blind-mate receptacle 802 to a bulkhead of a system device. In various embodiments, mounting brackets 802g may be configured to allow various rotational positions for ROF blind-mate receptacle 802 within the system. By allowing rotational position changes, mounting brackets 802g enable alternate reconfiguration from a parallel orientation (e.g., SFC-SFC configuration, PFC-PFC configuration) to an orthogonal orientation (e.g., SFC-PFC configuration, PFC-SFC configuration).

Figure 8B:
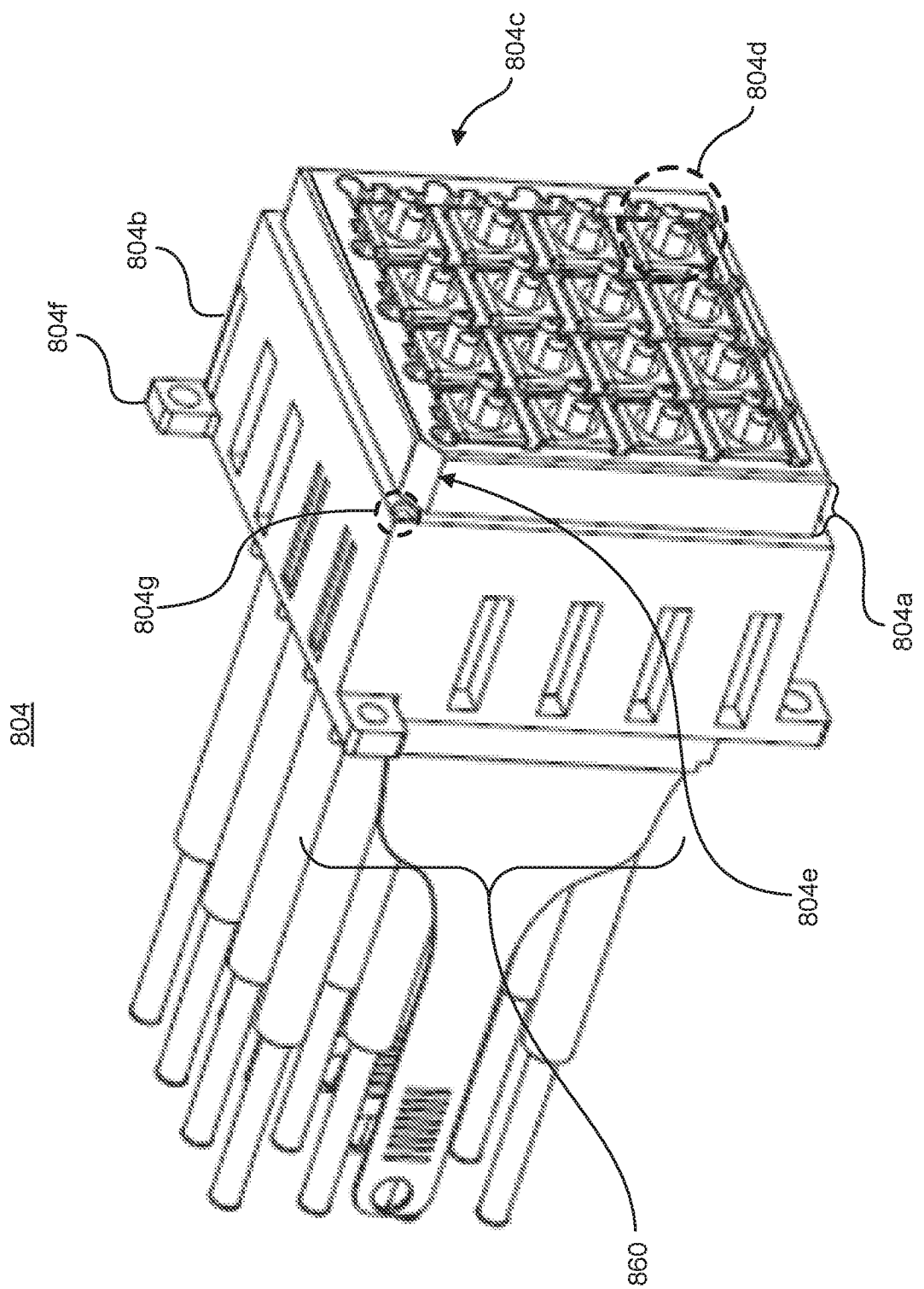
FIG. 8B is an example plug ROF blind-mate connector in accordance with embodiments of the technology disclosed herein.
Figure 9:
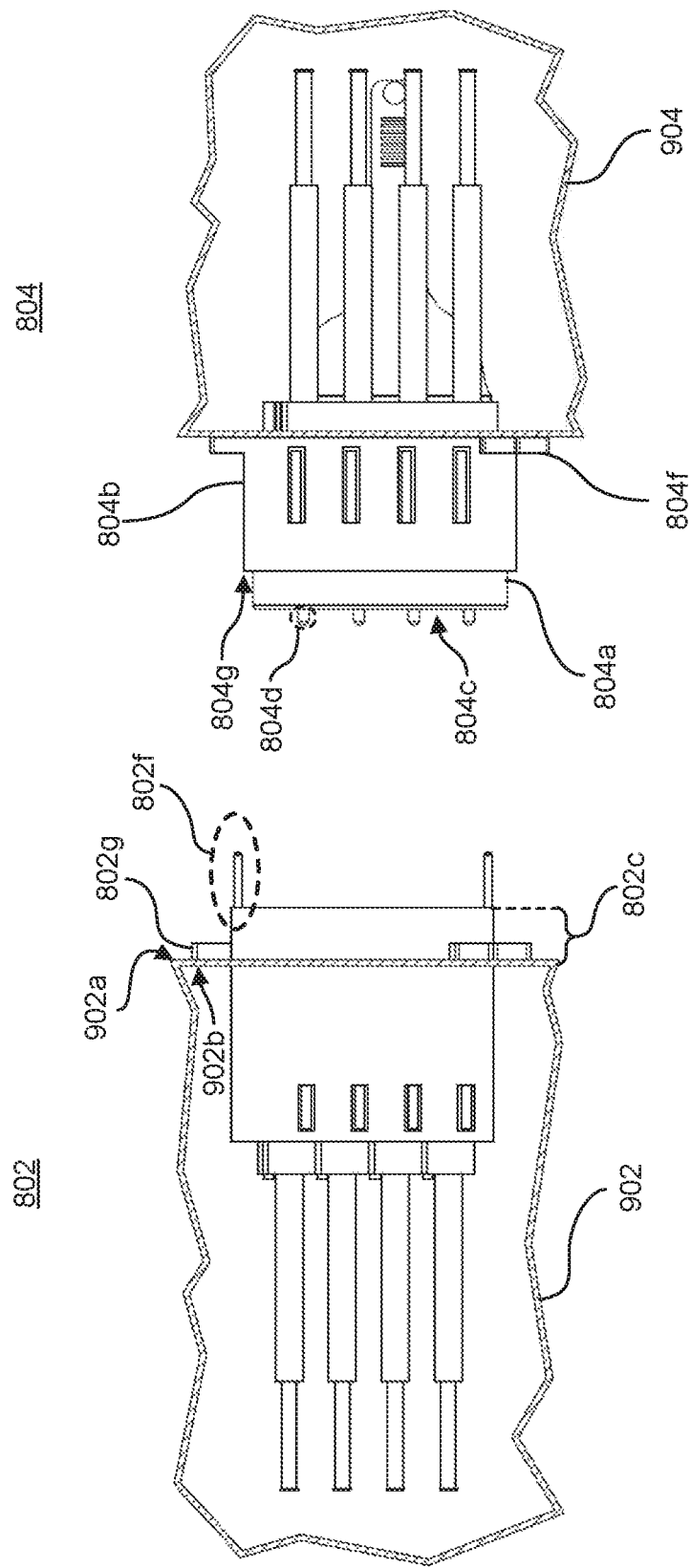
FIG. 9 illustrates an example ROF blind-mate connector pair in accordance with embodiments of the technology disclosed herein.

As mentioned above, ROF blind-mate plug 804, illustrated in FIG. 8B, is configured to mate with ROF blind-mate receptacle 802. Like ROF blind-mate receptacle 802, ROF blind-mate plug 804 also as two sides—the mating side and the ferrule carrier side. The ferrule carrier side is not presented to the viewer in the perspective view of FIG. 8B. As illustrated, a plurality of ferrule carriers 860 are inserted into the ferrule carrier side (i.e., ferrule carriers 860 are connected in a manner similar to the connection method discussed with respect to FIGS. 6A and 6B). Ferrule carriers 860 may comprise a plurality of PFCs or a plurality of SFCs, depending on the design of the particular implementation. In various embodiments, the interior of the ferrule carrier side may be configured similar to the interior of 616 of ROF carrier adapter 110 discussed above with respect to FIGS. 6A-6D.

As shown in FIG. 8B, ROF blind-mate plug 804 may include a protrusion 804a extending outward from the plug housing 804b. Protrusion 804a may be configured to mate with receptacle opening 802a of ROF blind-mate receptacle 802. In various embodiments, protrusion 804a may interact with the lead-in features discussed above with respect to ROF blind-mate receptacle 802. In various embodiments, protrusion 804a may have a depth equal to or more than the depth of the interior of ROF blind-mate receptacle 802 formed by receptacle opening 802a and face 802b, for protrusion 804a to bottom-out within cavity 802c, i.e., face 802b of ROF blind-mate receptacle can be viewed as a motion stop feature for protrusion 804a of ROF blind-mate plug 804.

As illustrated in FIG. 8B, protrusion 804a has a plug opening 804c. Plug opening 804c is configured to expose the ends of each ferrule carrier 860. When inserted into ROF blind-mate plug 804, the ferrules 804d contained within the duplex ferrule connectors inside each ferrule carrier 860 extends a distance past the protrusion 804a, as illustrated in FIG. 9. In some embodiments, protrusion 804a may include a plug keying feature 804e, disposed on a corner of protrusion 804a. Plug keying feature 804e may be configured to complement receptacle keying feature 802e of ROF blind-mate receptacle 802, to assist in ensuring that the intended configuration is maintained, regardless of the rotational position of ROF blind-mate plug 804 and ROF blind-mate receptacle 802. A plug keying feature 804e may be disposed at a corner of protrusion 804a that will allow ROF blind-mate plug 804 and ROF blind-mate receptacle 802 to be mated in one rotational position. When there is only one rotational position, SFC and PFC ferrule carriers can be populated in orthogonal orientations to allow SFC-PFC configuration for all-to-all connectivity within mated ROF blind-mate plug 804 and ROF blind-mate receptacle 802.

In other embodiments, two receptacle keying features 802e may be disposed at two corners of receptacle opening 802a that will allow ROF blind-mate plug 804 and ROF blind-mate receptacle 802 to be mated in two rotational positions. As a non-limited example, a first receptacle keying feature 802e may be disposed as illustrated in FIG. 8A, and a second receptacle keying feature may be disposed on an adjacent corner of receptacle opening 802a (e.g., the corner to the left of receptacle keying feature 802e, or the corner below of receptacle keying feature 802e). In this way, either first or second receptacle keying feature 802e may mate with the plug keying feature 804e in a first rotational position or a second rotational position (where ROF blind-mate plug 804 is rotated 90° from the first rotational position). ROF blind-mate plug 804 may include four cavities 804g disposed at each corner of plug housing 804b, enabling two perpendicular cavities 804g are configured to mate with guide features 802f in the first rotational position, and the other two perpendicular cavities 804g are configured to mate with guide features 802f in the second rotational position. When there are two rotational positions, SFC and PFC ferrule carriers can be populated in an in-line orientation to allow SFC-SFC or PFC-PFC configurations for some-to-some connectivity within a mated ROF blind-mate plug 804 and ROF blind-mate receptacle 802.

In various embodiments, ROF blind-mate plug 804 may include mounting brackets 804f, similar to mounting brackets 802g of ROF blind-mate receptacle 802. One or more cavities 804g configured to mate with corresponding guide features, such as guide features 802f on ROF blind-mate receptacle 802, discussed with respect to FIG. 8A. In various embodiments, mounting brackets 804f may be disposed on plug housing 804b to assist in aligning both blind-mate connectors 802, 804. In various embodiments, cavity 804g may be a recess etched into plug housing 804b.

FIG. 9 shows an ROF blind-mate connector pair 802, 804 in accordance with embodiments of the technology disclosed herein. As illustrated, ROF blind-mate receptacle 802 is installed within a first device 902, secured to first device 902 by a plurality of mounting brackets 802g. As illustrated, mounting brackets 802g mate with an exterior face 902a of first device 902, while in other embodiments mounting brackets 802g may be configured to mate with an interior face 902b of first device 902. In various embodiments, first device 902 may be one of a variety of networking modules (e.g., fabric switches) or resource modules (e.g., computing, storage, memory). In various embodiments, when installed in first device 902, a front portion 802c of ROF blind-mate receptacle 802 may extend outward from front face 902a. ROF blind-mate plug 804 may be installed in a second device 904 in a similar manner as that discussed with respect to ROF blind-mate receptacle 802 in various embodiments. As illustrated in FIG. 9, guide feature 802f and cavity 804 are arranged such that, when ROF blind-mate plug 804 is coupled to ROF blind-mate receptacle 802, guide feature 802f and cavity 804g are coupled first, receptacle keying feature 802e and plug keying feature 804e are coupled second, followed by protrusion 804a coupling with face 802b within the cavity of receptacle opening 802a, and finally ferrules 804d of ROF blind-mate plug 804 are coupled to ferrules of ROF blind-mate receptacle 802 (not shown in FIG. 8B). In some embodiments, the length of guide feature 802f is shorter than the depth of cavity 804g, to allow face 804c of ROF blind-mate plug 804 to bottom-out on cavity 802b of ROF blind-mate receptacle 802. When bottomed-out, the mated duplex ferrules are over-driven, i.e., pushed against each other, supported by the reactive force of carrier spring clips against duplex ferrule connectors within each ferrule carrier, as discussed above with respect to FIGS. 2A-2D. In various other embodiments, each ferrule may have an independent reactive spring within ferrule connector 140. The over-drive condition of ROF blind-mate plug 804 and ROF blind-mate receptacle 802 provides a positive mating force between the plurality of duplex ferrule connectors in ROF blind-mate plug 804 against the plurality of duplex ferrule connectors in ROF blind-mate plug 804, for reliable optical signal coupling at minimum optical signal losses.

Figure 10:
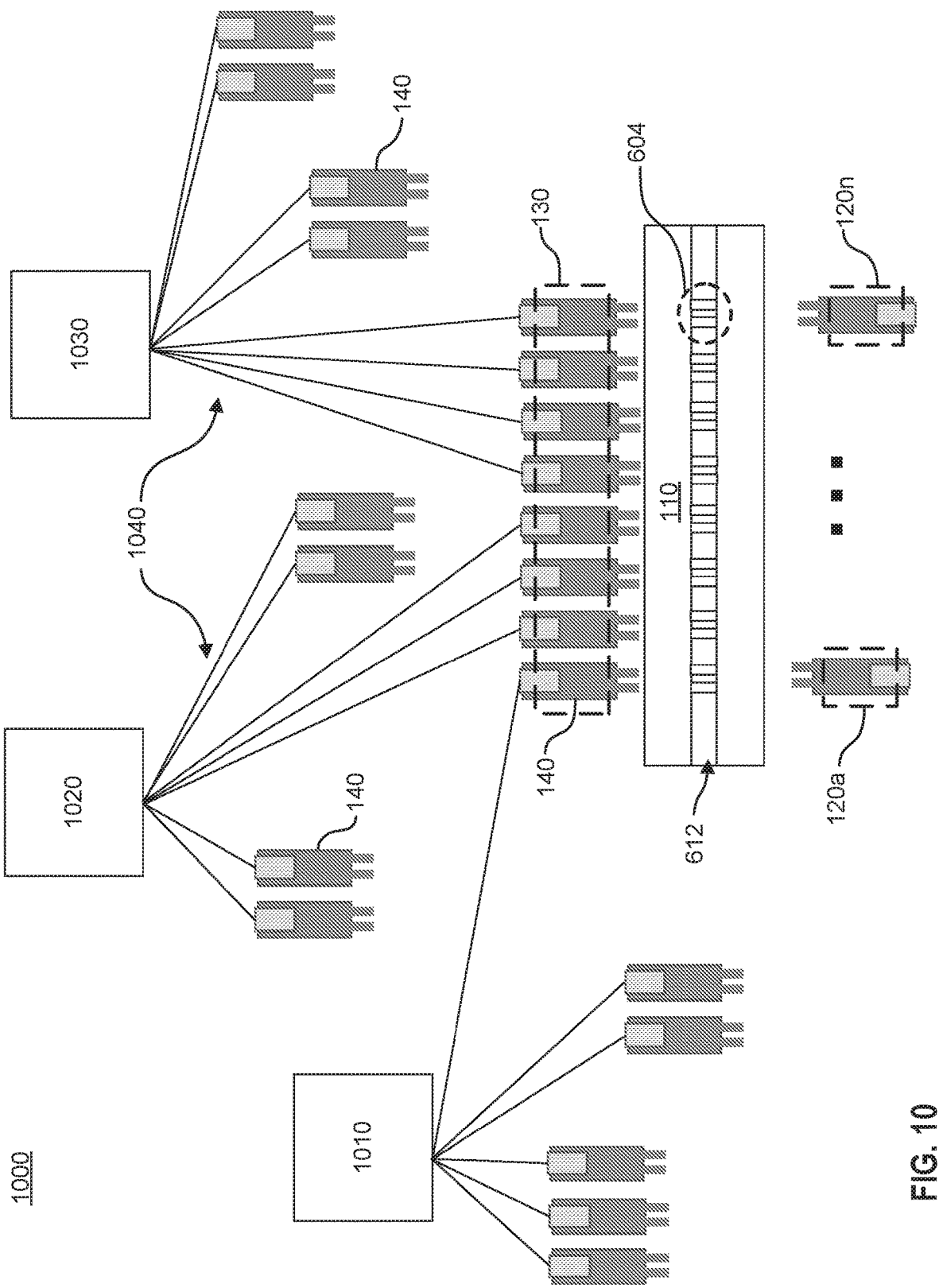
FIG. 10 illustrates an example intra-system implementation in accordance with embodiments of the technology disclosed herein.

As discussed above, the technology disclosed herein provides a system for high-density, low-cost, low-loss "all-to-all" "perfect shuffle" connections between ASICs and other chips/components (i.e., intra-system connectivity), as well as between rack-mount devices, such as blades and other network devices (i.e., inter-system connectivity). FIG. 10 is an example intra-system implementation 1000 in accordance with embodiments of the present disclosure. Intra-system implementation 1000 is provided for illustrative purposes only and should not be interpreted as limiting the scope of the present disclosure to only the illustrated implementation.

As shown in FIG. 10, intra-system implementation 1000 includes three chips 1010, 1020, 1030. In various embodiments, chips 1010, 1020, 1030 may comprise one or more type of processing devices and/or hard-wired circuitry. For ease of discussion, chips 1010, 1020, 1030 will be considered ASICs as a non-limiting example. As illustrated, each chip 1010, 1020, 1030 may include a fan-out cable assembly 1040. Fan-out cable assemblies 1040 are optical fiber cables containing several simplex optical fibers, packaged together within a larger cable. Each fan-out cable assembly 1040 comprises multiple duplex ferrule connectors 140. The various duplex ferrule connectors 140 may be distributed throughout the system. Embodiments of the technology disclosed herein enable optical fibers from different chips 1010, 1020, 1030 to be combined within a carrier (e.g., SFC 130 illustrated in FIG. 10). SFC 130 may be connected into one side of ROF carrier adapter 110, with each duplex ferrule connector 140 being aligned with a pair of ferrule mating sleeves 604 disposed within adapter mid-wall 612. For the orthogonal configuration illustrated in FIG. 10, a plurality of PFCs 120 may be inserted into the other side of ROF carrier adapter 110. PFCs 120 may be connected to additional chips (not shown in FIG. 10). Plurality of SFCs 130 on one side of an adapter 110 mating to plurality of PFCs 120 on the other side of the adapter 110 results in all-to-all connectivity among the chips. In other words, plurality of PFCs orthogonally mating to plurality of SFCs within an ROF carrier adapter 110 results in a perfect shuffle. The end result of all-to-all connections is like a traditional fiber shuffle assembly.

Unlike traditional approaches, the example implementation 1000 is not fixed, as it would be with current fiber shuffles. As discussed above, fiber shuffles are designed and built specifically for a given architecture, therefore requiring redesign when a change is desired. However, using the embodiments of the present disclosure allow for much easier reconfiguration. As opposed to being fixed, the plurality of PFCs 120 may be changed by assembling different sets of duplex ferrule connectors 140, and the plurality of SFCs 120 may be changed by assembling another different sets of duplex ferrule connectors 140, providing different PFC-SFC configuration without the need for building new, expensive, and bulky fiber shuffles. Moreover, the higher density of connections, compared to traditional fiber shuffles, enable by ROF carrier adapter 110 within the system reduces the number of stages through which optical signals need be routed.

Figure 11:
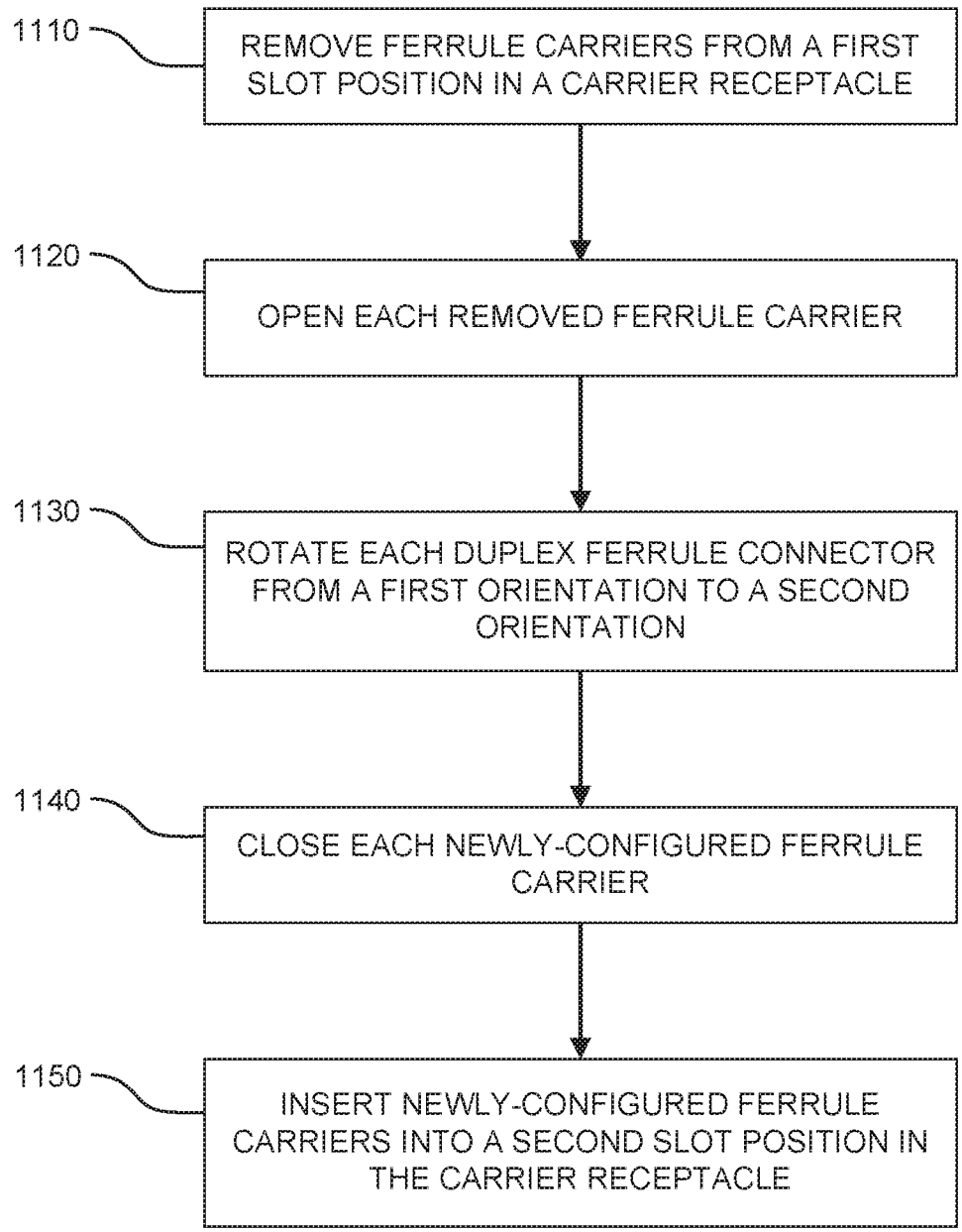
FIG. 11 illustrates an example method in accordance with embodiments of the technology disclosed herein.

FIG. 11 illustrated an example method 1100 in accordance with embodiments of the present disclosure. Method 1100 illustrates an example for reconfiguring a plurality of ferrule carriers from one configuration to another to change the orientation of an ROF carrier mating system, like the ROF carrier adapter 110 and/or the blind-mate connector system comprising ROF blind-mate receptacle 802 and ROF blind-mate plug 804, discussed above with respect to FIGS. 1-10. Method 1100 is provided for illustrative purposes only and should not be interpreted as limiting the scope of the subject matter to only the illustrated method.

At operation 1110, a plurality of ferrule carriers in a first slot position are removed from a ferrule carrier receptacle.

In various embodiments, the plurality of ferrule carriers may be a PFC 120 or an SFC 130. The first slot position within the ferrule carrier may be a horizontal orientation, like horizontal orientation 606*b* discussed above with respect to FIG. 6A, while in other embodiments the first slot position may be a vertical orientation such as vertical orientation 606*a* discussed with respect to FIG. 6A. In various embodiments, the ferrule carrier receptacle may be one of the two sides of an ROF carrier adapter, such as ROF carrier adapter 110. In other embodiments, the ferrule carrier receptacle may be part of an ROF blind-mate receptacle (e.g., ROF blind-mate receptacle 802) or an ROF blind-mate plug (e.g., ROF blind-mate plug 804).

At operation 1120, each of the removed ferrule carriers are opened. In various embodiments, the ferrule carriers may be similar to the ferrule carriers PFC 120 and SFC 130 discussed above with respect to FIGS. 1-5. At operation 1130, each of the plurality of duplex ferrule connectors of each removed ferrule carrier is rotated from its original orientation (i.e., a first orientation) to a new orientation (i.e., a second orientation). In various embodiments, the rotation of duplex ferrule carriers may be done in a manner similar to that discussed with respect to FIGS. 2A-2D, 3A-3B, and 4. In this way, the nature of the ferrule carrier (i.e., its configuration as either an SFC or a PFC) may be changed without the need to dissemble the duplex ferrule connectors. In various embodiments, the first orientation may be associated with a parallel configuration (i.e., when inserted, the duplex ferrule connectors result in a PFC), and the second orientation may be associated with a serial configuration (i.e., when inserted, the duplex ferrule connectors result in an SFC). In other embodiments, the first orientation may be associated with a serial configuration, and the second orientation may be associated with a parallel configuration.

At operation 1140, each of the newly-configured ferrule carriers are closed, and at operation 1150 the plurality of newly-configured ferrule carriers are inserted into a second slot position in the ferrule carrier receptacle. In various embodiments, the second slot position may be similar to the vertical orientation 606*a* or the horizontal orientation 606*b* discussed with respect to FIG. 6A.

Implementations of method 1100 enables easier reconfiguration of an optical interconnect without the need for an expensive and time consuming redesign of the duplex ferrule connectors, of any necessary optical fiber shuffles, or both. Rather, if an interconnect needs to be changed from providing all-to-all connectivity (i.e., SFC-PFC configuration) to providing some-to-some connectivity (e.g., PFC-PFC inline configuration), a data center administrator need only remove the ferrule carriers and rotate the duplex ferrule connectors within 90°.

As discussed above, example method 1100 is applicable for reconfiguring both intra- and inter-system optical interconnects. A person of ordinary skill in the art would understand that other method operations may be performed to implement the different configuration aspects discussed above with respect to FIGS. 1-10. As a non-limiting example, a person of ordinary skill in the art would know that the rotational keying discussed with respect to FIGS. 8A, 8B, and 9 may include an operation to identify a rotational position of ROF blind-mate receptacle and/or ROF blind-mate plug.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A reconfigurable optical ferrule (ROF) carrier, comprising:
  a base comprising a plurality of ferrule bays, each ferrule bay being configured to hold a duplex ferrule connector; and
  the ferrule bays comprising a first alignment feature configured to position the duplex ferrule connector in a parallel orientation and a second alignment feature configured to position the duplex ferrule connector in a serial orientation,
  wherein a configuration type of the ROF carrier is determined based on an orientation of a plurality of duplex ferrule connectors within the plurality of ferrule bays of the base.

2. The ROF carrier of claim 1, comprising a lid coupled to a first wall of the base by a hinge, the hinge configured to enable the lid to pivot into a closed position to secure the plurality of duplex ferrule connectors within the base.

3. The ROF carrier of claim 1, comprising a plurality of carrier spring clip pairs, each carrier spring clip pair associated with a ferrule bay of the plurality of ferrule bays and configured to allow the duplex ferrule connector within the ferrule bay to independently float in a z-direction from each other duplex ferrule connector.

4. The ROF carrier of claim 1, each duplex ferrule connector of the plurality of duplex ferrule connectors comprises:
  a transmit ferrule with a first optical fiber attached and a receive ferrule with a second optical fiber attached;
  a housing having a front opening, the transmit ferrule and the receive ferrule being disposed within the housing; and
  at least one connector alignment feature disposed on a surface of the housing and configured to mate with the first alignment feature when the ROF carrier is in a parallel orientation and the second alignment feature when the ROF carrier is in a serial orientation.

5. The ROF carrier of claim 1, wherein the hinge is configured to mate with a carrier keying feature of an adapter.

6. The ROF carrier of claim 1, wherein the configuration type is changed by rotating each duplex ferrule connector of the plurality of duplex ferrule connectors from a first orientation corresponding to the first alignment feature of the base to a second orientation corresponding to the second alignment feature of the base.

* * * * *